US012802386B2

(12) United States Patent
Liu et al.

(10) Patent No.: US 12,802,386 B2
(45) Date of Patent: Nov. 17, 2026

(54) EFFICIENTLY PROCESSING IMAGE DATA BASED ON A REGION OF INTEREST

(71) Applicant: QUALCOMM Incorporated, San Diego, CA (US)

(72) Inventors: Zhen Liu, San Diego, CA (US); Rajakumar Govindaram, San Diego, CA (US); Rohan Desai, San Diego, CA (US); Jiafu Luo, Irvine, CA (US); Satish Goverdhan, San Diego, CA (US); Pawan Kumar Baheti, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 490 days.

(21) Appl. No.: 18/471,891

(22) Filed: Sep. 21, 2023

(65) Prior Publication Data

US 2025/0104379 A1 Mar. 27, 2025

(51) Int. Cl.

| | |
|---|---|
| ***G06V 10/25*** | (2022.01) |
| ***G06F 3/01*** | (2006.01) |
| ***G06T 3/4053*** | (2024.01) |
| ***G06T 5/20*** | (2006.01) |
| ***G06T 5/70*** | (2024.01) |
| ***G06T 5/92*** | (2024.01) |
| ***H04N 23/84*** | (2023.01) |
| ***H04N 25/611*** | (2023.01) |

(52) U.S. Cl.

CPC .............. *G06V 10/25* (2022.01); *G06F 3/013* (2013.01); *G06T 3/4053* (2013.01); *G06T 5/20* (2013.01); *G06T 5/70* (2024.01); *G06T 5/92* (2024.01); *H04N 23/843* (2023.01); *H04N 25/611* (2023.01)

(58) Field of Classification Search

CPC .... G06V 10/25; H04N 23/843; H04N 25/611; G06T 5/92; G06T 5/70; G06T 5/20; G06F 3/013; G06F 3/4063

USPC .......................................................... 382/103

See application file for complete search history.

(56) References Cited

U.S. PATENT DOCUMENTS

| | | | | |
|---|---|---|---|---|
| 2006/0045381 | A1* | 3/2006 | Matsuo | H04N 19/61<br>375/E7.145 |
| 2017/0041605 | A1* | 2/2017 | Watanabe | H04N 19/167 |
| 2022/0279110 | A1 | 9/2022 | Suzuki et al. | |

FOREIGN PATENT DOCUMENTS

WO 2023163799 A1 8/2023

OTHER PUBLICATIONS

International Search Report and Written Opinion—PCT/US2024/043911—ISA/EPO—Dec. 2, 2024.

* cited by examiner

*Primary Examiner* — Gabriel I Garcia
(74) *Attorney, Agent, or Firm* — Polsinelli LLP

(57) ABSTRACT

Systems and techniques are described herein for processing data. For instance, an apparatus for processing data is provided. The apparatus may include an image signal processor (ISP) configured to: receive image data and an indication of a region of interest (ROI) from an image sensor; determine image-processing settings for processing the image data based on the ROI; and process the image data based on the image-processing settings.

30 Claims, 13 Drawing Sheets

EFFICIENTLY PROCESSING IMAGE DATA BASED ON A REGION OF INTEREST

TECHNICAL FIELD

The present disclosure generally relates to efficiently processing image data based on a region of interest. For example, aspects of the present disclosure include systems and techniques for receiving, at an image signal processor, image data and an indication of a region of interest (ROI) of the image data from an image sensor, determining image-processing settings based on the ROI, and processing the image data based on the image-processing settings.

BACKGROUND

A camera is a device that receives light and captures image frames, such as still images or video frames, using an image sensor. Cameras can be configured with a variety of image-capture settings and/or image-processing settings to alter the appearance of images captured thereby. Image-capture settings may be determined and applied before and/or while an image is captured, such as ISO, exposure time (also referred to as exposure, exposure duration, or shutter speed), aperture size, (also referred to as f/stop), focus, and gain (including analog and/or digital gain), among others. Moreover, image-processing settings can be configured for post-processing of an image, such as alterations to contrast, brightness, saturation, sharpness, levels, curves, and colors, among others.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for processing data. According to at least one example, an apparatus is provided for processing data. The apparatus includes: an image signal processor (ISP) configured to: receive image data and an indication of a region of interest (ROI) from an image sensor; determine image-processing settings for processing the image data based on the ROI; and process the image data based on the image-processing settings.

In another example, a method for processing data is provided. The method includes receiving, at an image signal processor (ISP), image data and an indication of a region of interest (ROI) from an image sensor; determining, at the ISP, image-processing settings for processing the image data based on the ROI; and processing, at the ISP, the image data based on the image-processing settings.

In another example, an apparatus for processing data is provided that includes at least one memory and at least one processor (e.g., an image signal processor (ISP)) (e.g., configured in circuitry) coupled to the at least one memory. The at least one processor configured to: receive image data and an indication of a region of interest (ROI) from an image sensor; determine image-processing settings for processing the image data based on the ROI; and process the image data based on the image-processing settings.

In another example, a non-transitory computer-readable medium is provided that has stored thereon instructions that, when executed by one or more processors (e.g., one or more image signal processors (ISPs)), cause the one or more processors to: receive image data and an indication of a region of interest (ROI) from an image sensor; determine image-processing settings for processing the image data based on the ROI; and process the image data based on the image-processing settings.

In another example, an apparatus for processing data is provided. The apparatus includes: means for receiving image data and an indication of a region of interest (ROI) from an image sensor; means for determining image-processing settings for processing the image data based on the ROI; and means for processing the image data based on the image-processing settings.

In some aspects, one or more of the apparatuses described herein is, can be part of, or can include a mobile device (e.g., a mobile telephone or so-called "smart phone", a tablet computer, or other type of mobile device), an extended reality device (e.g., a virtual reality (VR) device, an augmented reality (AR) device, or a mixed reality (MR) device), a vehicle (or a computing device or system of a vehicle), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
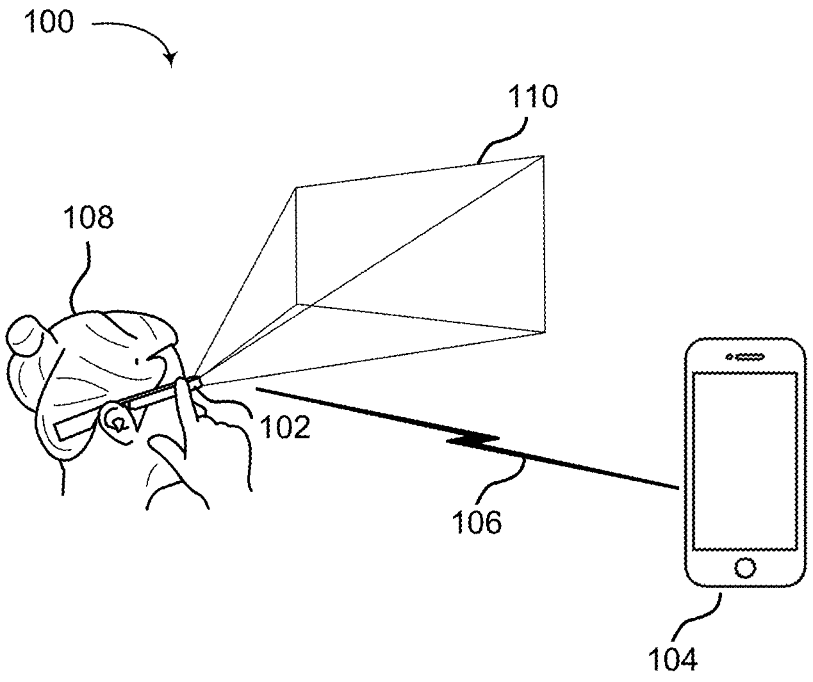
FIG. 1 is a diagram illustrating an example of an extended reality (XR) system, according to aspects of the disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

A camera is a device that receives light and captures image data (e.g., still image frames or frames of video data) using an image sensor. Electronic devices (e.g., mobile phones, wearable devices (e.g., smart watches, smart glasses, etc.), tablet computers, extended reality (XR) devices (e.g., virtual reality (VR) devices, augmented reality (AR) devices, mixed reality (MR) devices, and the like), connected devices, laptop computers, etc.) are increasingly equipped with camera hardware to capture image frames, such as still images and/or video frames, for consumption. For example, an electronic device can include a camera to allow the electronic device to capture a video or image of a scene, a person, an object, etc. Additionally, cameras themselves are used in a number of configurations (e.g., handheld digital cameras, digital single-lens-reflex (DSLR) cameras, worn camera (including body-mounted cameras and head-borne cameras), stationary cameras (e.g., for security and/or monitoring), vehicle-mounted cameras, etc.).

Cameras can be configured with a variety of image-capture settings and image-processing settings to alter the appearance of an image. Image-camera settings can be determined and applied before or while an image is captured, such as ISO, exposure time (also referred to as exposure duration and/or shutter speed), aperture size (also referred to as f/stop), focus, and gain, among others. Image-processing settings can be configured for post-processing of an image, such as alterations to contrast, brightness, saturation, sharpness, levels, curves, and colors, among others.

In some examples, a camera may include one or more processors, such as image signal processors (ISPs), that can process image data captured by an image sensor. For example, a raw image frame captured by an image sensor can be processed by an ISP of a camera (e.g., to alter the contrast, brightness, saturation, sharpness, levels, curves, and/or colors of the raw image frame) to generate a final image frame. In some cases, an electronic device implementing a camera can further process a captured image or video for certain effects (e.g., compression, image enhancement, image restoration, scaling, framerate conversion, etc.) and/or certain applications such as computer vision, extended reality (e.g., augmented reality, virtual reality, and the like), object detection, image recognition (e.g., face recognition, object recognition, scene recognition, etc.), feature extraction, authentication, and automation, among others.

A camera may include an image-capture device (or portion) including one or more image sensors that may capture light and generate raw image frames based thereon. The camera may include in image-processing device (or portion) including one or more image signal processors (ISPs) that may process the raw image frames. The image-processing device (or portion) may include a frontend portion and a backend portion. The image-capture device (or portion) may stream raw image data to the frontend portion of the image-processing device (or portion). The frontend portion may perform one or more operations on the raw image data (e.g., as the raw image data is received). For example, the frontend portion may perform one or more operations related to Bad Pixel Correction (BPC), lens correction, lens-shading correction, phase-detection pixel correction, demosaicing, lateral chromatic aberration correction, Bayer filtering, adaptive Bayer filtering, tone mapping, noise reduction, etc. The frontend portion may provide processed image frames to the backend portion, for example, by writing the processed image frames to a memory, such as a double data rate (DDR) synchronous dynamic random-access memory (SDRAM) or any other memory device. The backend portion can retrieve the processed image frames from the memory and further process the image frames. For example, the backend portion may perform motion stabilization on the processed image frames.

The image-processing operations and/or the write and/or read operations between the frontend portion and the backend portion can result in significant power, bandwidth, and/or time consumption. One technique for conserving power, bandwidth, and/or processing time includes processing image frames based on respective regions of interest (ROIs) in the image frames. For example, rather than processing an entire image frame at full resolution, such techniques may process an ROI of the image frame at full resolution and process a non-ROI region of the image frame (e.g., outside the ROI) at less than full resolution. Processing the non-ROI region at less than full resolution may mean fewer pixels are processed (and/or written to and read from memory between the frontend portion and the backend portion), which may conserve power, bandwidth, and/or processing time. The final image may have less resolution in the non-ROI region, but the non-ROI region may be of less interest than the ROI and thus the decrease in resolution may be unnoticeable or unimportant. For example, an ROI may be based on a gaze of a user. The user may desire a high resolution where the user is looking but may not notice a lower resolution in a region outside where the user is looking.

In general, the earlier in an ISP processing pipeline that a reduction in resolution of a portion of an image is implemented, the greater the conservation in power, bandwidth and/or processing time. For example, if a frontend ISP includes three ISP engines (e.g., arranged in series and each performing a separate operation), reducing the resolution of a non-ROI region at or before a first ISP of the three ISP engines may conserve more power and/or processing time than reducing the resolution of the non-ROI region at the third ISP engine.

Systems, apparatuses, methods (also referred to as processes), and computer-readable media (collectively referred to herein as "systems and techniques") are described herein for efficiently processing image data based on an ROI. The systems and techniques described herein may include implementing ROI-based imaging techniques at an image sensor. For example, an image sensor may generate image data at full resolution within an ROI of an image frame and having a lower resolution outside the ROI within the image frame. The image data, having a lower resolution outside the ROI, may include be smaller (e.g., may include fewer pixels) than the image data would if the entire image were at full resolution. The systems and techniques may conserve power, bandwidth and/or processing time by processing smaller image data when compared with other systems that may process full-resolution image data. Further, the systems and techniques may conserve more power, bandwidth, and/or processing time than other systems by reducing the size of the image data at the image sensor rather than partway through an ISP pipeline.

One challenge in implementing ROI-based techniques (e.g., reducing resolution of a non-ROI region) at an image sensor is coordinating the operations of the image sensor and the operations of the ISP. For example, an image sensor may generate raw image data and provide the raw image data to a frontend ISP. The frontend ISP may operate on the raw image data as it is received. If a first portion of the raw image data (e.g., corresponding to an ROI) has a relatively high resolution and a second portion (e.g., corresponding to a non-ROI region) has a relatively low resolution, it may be important for the frontend ISP to know the location and size of the data the frontend ISP is receiving in the whole frame full resolution coordinate. One approach to coordinating the operations of an image sensor to the operations of a frontend ISP includes providing indications of the ROIs to both the image sensor and to the frontend ISP. However, in such an approach, the timing of providing the indications of the ROIs to the frontend ISP is critical and timing delays or resets may cause the timing to be off, which may result in errors in processing the image data at the frontend ISP.

The systems and techniques may enable implementing ROI-based techniques at an image sensor by causing an image sensor to provide an indication of the ROI to the frontend ISP. For example, the systems and techniques may cause the image sensor to provide an ROI indicator and the image data to the frontend ISP. The frontend ISP may receive the image data and the ROI indicator at substantially the same time (e.g., in the same data packet) and may thereby easily determine the correlation between the image data and the ROI. In this way the systems and techniques may enable implementation of ROI-based techniques at an image sensor which may conserve power, bandwidth and/or processing time throughout the ISP pipeline.

Various aspects of the application will be described with respect to the figures below.

FIG. 1 is a diagram illustrating an example of an extended reality (XR) system 100, according to aspects of the disclosure. As shown, XR system 100 includes an XR device 102, a companion device 104, and a communication link 106 between XR device 102 and companion device 104. In some cases, XR device 102 may generally implement display, image-capture, and/or view-tracking aspects of extended reality, including virtual reality (VR), augmented reality (AR), mixed reality (MR), etc. In some cases, companion device 104 may generally implement computing aspects of extended reality. For example, XR device 102 may capture images of an environment of a user 108 and provide the images to companion device 104 (e.g., via communication link 106). Companion device 104 may render virtual content (e.g., related to the captured images of the environment) and provide the virtual content to XR device 102 (e.g., via communication link 106). XR device 102 may display the virtual content to a user 108 (e.g., within a field of view 110 of user 108).

Generally, XR device 102 may display virtual content to be viewed by a user 108 in field of view 110. In some examples, XR device 102 may include a transparent surface (e.g., optical glass) such that virtual objects may be displayed on (e.g., by being projected onto) the transparent surface to overlay virtual content on real-word objects viewed through the transparent surface (e.g., in a see-through configuration). In some cases, XR device 102 may include a camera and may display both real-world objects (e.g., as frames or images captured by the camera) and virtual objects overlaid on the displayed real-world objects (e.g., in a pass-through configuration). In various examples, XR device 102 may include aspects of a virtual reality headset, smart glasses, a live feed video camera, a GPU, one or more sensors (e.g., such as one or more inertial measurement units (IMUs), image sensors, microphones, etc.), one or more output devices (e.g., such as speakers, display, smart glass, etc.), etc.

Companion device 104 may render the virtual content to be displayed by companion device 104. In some examples, companion device 104 may be, or may include, a smartphone, laptop, tablet computer, personal computer, gaming system, a server computer or server device (e.g., an edge or cloud-based server, a personal computer acting as a server device, or a mobile device acting as a server device), any other computing device and/or a combination thereof.

Communication link 106 may be a wireless connection according to any suitable wireless protocol, such as, for example, Institute of Electrical and Electronics Engineers (IEEE) 802.11 (Wi-Fi), IEEE 802.15, or Bluetooth®. In some cases, communication link 106 may be a direct wireless connection between XR device 102 and companion device 104. In other cases, communication link 106 may be through one or more intermediary devices, such as, for example, routers or switches and/or across a network.

It may be beneficial to increase the efficiency of processing image data captured by a camera of XR device 102. For example, a camera of XR device 102 may capture image data. One or more image-signal processors (ISPs) on XR device 102 and/or one or more ISPs on companion device 104 may be used to process the image data. It may be beneficial to the operation of XR system 100 to reduce the size of the captured image data (e.g., by reducing the resolution of non-region of interest (ROI) portions of the image data) to conserve power, bandwidth and/or processing time within XR system 100. It may be particularly beneficial to reduce the size of the image data within the ISPs of XR device 102 to conserve power of XR device 102 (e.g., which may be powered by a relatively small battery).

Figure 2:
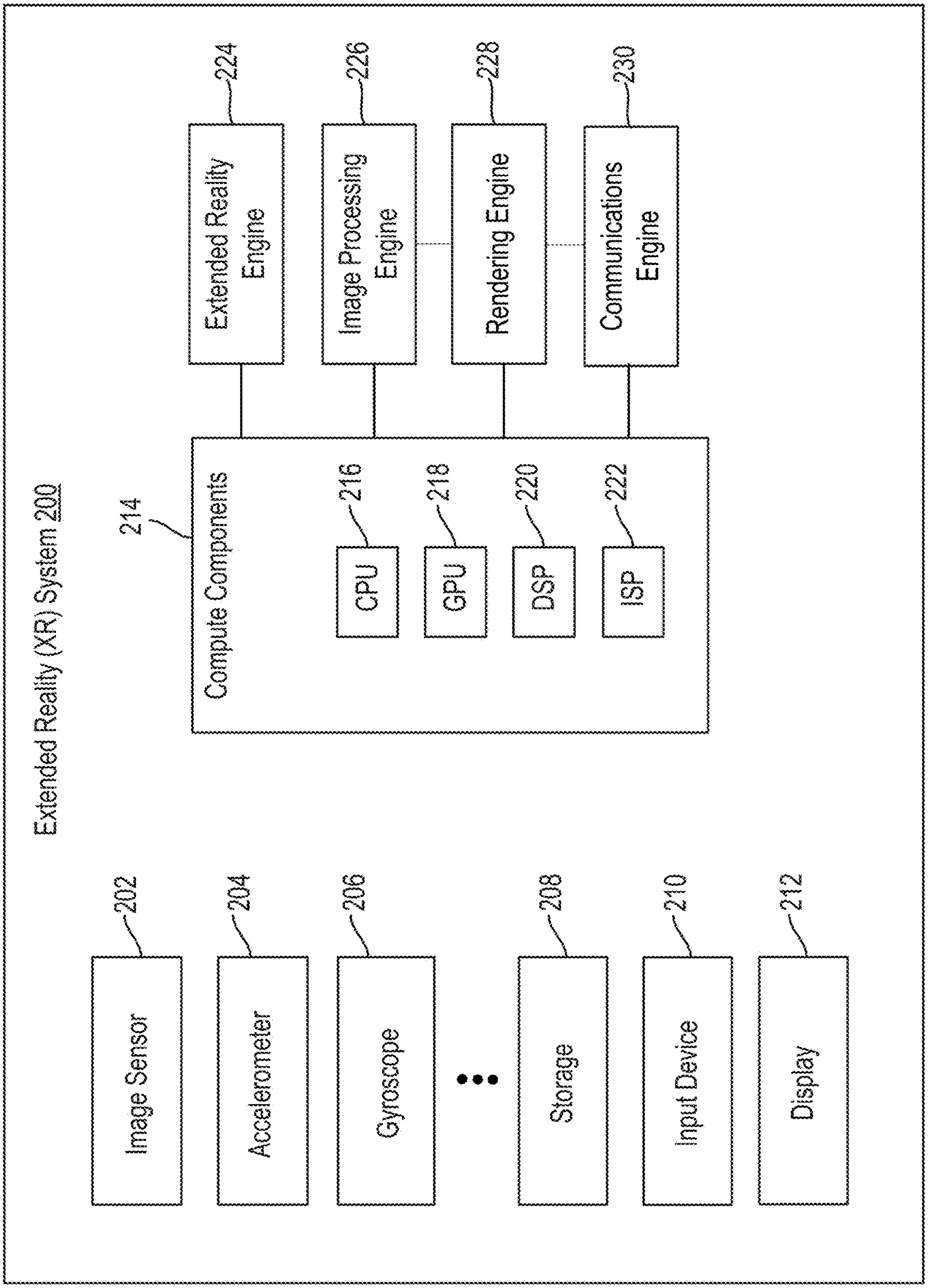
FIG. 2 is a block diagram illustrating an architecture of an example extended reality (XR) system, in accordance with some aspects of the disclosure.

FIG. 2 is a diagram illustrating an architecture of an example extended reality (XR) system 200, in accordance with some aspects of the disclosure. XR system 200 may execute XR applications and implement XR operations. The architecture of XR system 200 may be an example of the architecture of XR system 100 of FIG. 1.

In this illustrative example, XR system 200 includes one or more image sensors 202, an accelerometer 204, a gyroscope 206, storage 208, an input device 210, a display 212, Compute components 214, an XR engine 224, an image processing engine 226, a rendering engine 228, and a communications engine 230. It should be noted that the components 202-230 shown in FIG. 2 are non-limiting examples provided for illustrative and explanation purposes, and other examples may include more, fewer, or different components than those shown in FIG. 2. For example, in some cases, XR system 200 may include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors, audio sensors, etc.), one or more display devices, one more other processing engines, one or more other hardware components, and/or one or more other software and/or hardware components that are not shown in FIG. 2. While various components of XR, system 200, such as image sensor 202, may be referenced in the singular form herein, it should be understood that XR system 200 may include multiple of any component discussed herein (e.g., multiple image sensors 202).

Display 212 may be, or may include, a glass, a screen, a lens, a projector, and/or other display mechanism that allows a user to see the real-world environment and also allows XR content to be overlaid, overlapped, blended with, or otherwise displayed thereon.

XR system 200 may include, or may be in communication with, (wired or wirelessly) an input device 210. Input device 210 may include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device discussed herein, or any combination thereof. In some cases, image sensor 202 may capture images that may be processed for interpreting gesture commands.

XR system 200 may also communicate with one or more other electronic devices (wired or wirelessly). For example, communications engine 230 may be configured to manage connections and communicate with one or more electronic devices. In some cases, communications engine 230 may correspond to communication interface 1226 of FIG. 12.

In some implementations, image sensors 202, accelerometer 204, gyroscope 206, storage 208, display 212, compute components 214, XR engine 224, image processing engine 226, and rendering engine 228 may be part of the same computing device. For example, in some cases, image sensors 202, accelerometer 204, gyroscope 206, storage 208, display 212, compute components 214, XR engine 224, image processing engine 226, and rendering engine 228 may be integrated into an HMD, extended reality glasses, smartphone, laptop, tablet computer, gaming system, and/or any other computing device. However, in some implementations, image sensors 202, accelerometer 204, gyroscope 206, storage 208, display 212, compute components 214, XR engine 224, image processing engine 226, and rendering engine 228 may be part of two or more separate computing devices. For instance, in some cases, some of the components 202-230 may be part of, or implemented by, one computing device and the remaining components may be part of, or implemented by, one or more other computing devices. For example, such as in a split perception XR system, XR system 200 may include a first device (e.g., an HMD such as XR device 102 of FIG. 1), including display 212, image sensor 202, accelerometer 204, gyroscope 206, and/or one or more compute components 214. XR system 200 may also include a second device including additional compute components 214 (e.g., companion device 104 of FIG. 1 which may implement XR engine 224, image processing engine 226, rendering engine 228, and/or communications engine 230). In such an example, the second device may generate virtual content based on information or data (e.g., images, sensor data such as measurements from accelerometer 204 and gyroscope 206) and may provide the virtual content to the first device for display at the first device. The second device may be, or may include, a smartphone, laptop, tablet computer, personal computer, gaming system, a server computer or server device (e.g., an edge or cloud-based server, a personal computer acting as a server device, or a mobile device acting as a server device), any other computing device and/or a combination thereof.

Storage 208 may be any storage device(s) for storing data. Moreover, storage 208 may store data from any of the components of XR system 200. For example, storage 208 may store data from image sensor 202 (e.g., image or video data), data from accelerometer 204 (e.g., measurements), data from gyroscope 206 (e.g., measurements), data from compute components 214 (e.g., processing parameters, preferences, virtual content, rendering content, scene maps, tracking and localization data, object detection data, privacy data, XR application data, face recognition data, occlusion data, etc.), data from XR engine 224, data from image processing engine 226, and/or data from rendering engine 228 (e.g., output frames). In some examples, storage 208 may include a buffer for storing frames for processing by compute components 214.

Compute components 214 may be, or may include, a central processing unit (CPU) 216, a graphics processing unit (GPU) 218, a digital signal processor (DSP) 220, an image signal processor (ISP) 222, and/or other processor (e.g., a neural processing unit (NPU) implementing one or more trained neural networks). Compute components 214 may perform various operations such as image enhancement, computer vision, graphics rendering, extended reality operations (e.g., tracking, localization, pose estimation, mapping, content anchoring, content rendering, predicting, etc.), image and/or video processing, sensor processing, recognition (e.g., text recognition, facial recognition, object recognition, feature recognition, tracking or pattern recognition, scene recognition, occlusion detection, etc.), trained machine-learning operations, filtering, and/or any of the various operations described herein. In some examples, compute components 410 may implement (e.g., control, operate, etc.) XR engine 224, image processing engine 226, and rendering engine 228. In other examples, compute components 214 may also implement one or more other processing engines.

Image sensor 202 may include any image and/or video sensors or capturing devices. In some examples, image sensor 202 may be part of a multiple-camera assembly, such as a dual-camera assembly. Image sensor 202 may capture image and/or video content (e.g., raw image and/or video data), which may then be processed by compute components 214, XR engine 224, image processing engine 226, and/or rendering engine 228 as described herein.

In some examples, image sensor 202 may capture image data and may generate images (also referred to as frames) based on the image data and/or may provide the image data or frames to XR engine 224, image processing engine 226, and/or rendering engine 228 for processing. An image or frame may include a video frame of a video sequence or a still image. An image or frame may include a pixel array representing a scene. For example, an image may be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, image sensor 202 (and/or other camera of XR system 200) may be configured to also capture depth information. For example, in some implementations, image sensor 202 (and/or other camera) may include an RGB-depth (RGB-D) camera. In some cases, XR system 200 may include one or more depth sensors (not shown) that are separate from image sensor 202 (and/or other camera) and that may capture depth information. For instance, such a depth sensor may obtain depth information independently from image sensor 202. In some examples, a depth sensor may be physically installed in the same general location or position as image sensor 202 but may operate at a different frequency or frame rate from image sensor 202. In some examples, a depth sensor may take the form of a light source that may project a structured or textured light pattern, which may include one or more narrow bands of light, onto one or more objects in a scene. Depth information may then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

XR system 200 may also include other sensors in its one or more sensors. The one or more sensors may include one or more accelerometers (e.g., accelerometer 204), one or more gyroscopes (e.g., gyroscope 206), and/or other sensors. The one or more sensors may provide velocity, orientation, and/or other position-related information to compute components 214. For example, accelerometer 204 may detect acceleration by XR system 200 and may generate acceleration measurements based on the detected acceleration. In some cases, accelerometer 204 may provide one or more translational vectors (e.g., up/down, left/right, forward/back) that may be used for determining a position or pose of XR system 200. Gyroscope 206 may detect and measure the orientation and angular velocity of XR system 200. For example, gyroscope 206 may be used to measure the pitch, roll, and yaw of XR system 200. In some cases, gyroscope 206 may provide one or more rotational vectors (e.g., pitch, yaw, roll). In some examples, image sensor 202 and/or XR engine 224 may use measurements obtained by accelerometer 204 (e.g., one or more translational vectors) and/or gyroscope 206 (e.g., one or more rotational vectors) to calculate the pose of XR system 200. As previously noted, in other examples, XR system 200 may also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors may include at least one IMU. An IMU is an electronic device that measures the specific force, angular rate, and/or the orientation of XR system 200, using a combination of one or more accelerometers, one or more gyroscopes, and/or one or more magnetometers. In some examples, the one or more sensors may output measured information associated with the capture of an image captured by image sensor 202 (and/or other camera of XR system 200) and/or depth information obtained using one or more depth sensors of XR system 200.

The output of one or more sensors (e.g., accelerometer 204, gyroscope 206, one or more IMUs, and/or other sensors) can be used by XR engine 224 to determine a pose of XR system 200 (also referred to as the head pose) and/or the pose of image sensor 202 (or other camera of XR system 200). In some cases, the pose of XR system 200 and the pose of image sensor 202 (or other camera) can be the same. The pose of image sensor 202 refers to the position and orientation of image sensor 202 relative to a frame of reference (e.g., with respect to a field of view 110 of FIG. 1). In some implementations, the camera pose can be determined for 6-Degrees of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees of Freedom (3DoF), which refers to the three angular components (e.g. roll, pitch, and yaw).

In some cases, a device tracker (not shown) can use the measurements from the one or more sensors and image data from image sensor 202 to track a pose (e.g., a 6DoF pose) of XR system 200. For example, the device tracker can fuse visual data (e.g., using a visual tracking solution) from the image data with inertial data from the measurements to determine a position and motion of XR system 200 relative to the physical world (e.g., the scene) and a map of the physical world. As described below, in some examples, when tracking the pose of XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of XR system 200 within the scene and the 3D map of the scene, etc. The 3D map can provide a digital representation of a scene in the real/physical world. In some examples, the 3D map can anchor position-based objects and/or content to real-world coordinates and/or objects. XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or XR system 200 as a whole can be determined and/or tracked by compute components 214 using a visual tracking solution based on images captured by image sensor 202 (and/or other camera of XR system 200). For instance, in some examples, compute components 214 can perform tracking using computer vision-based tracking, model-based tracking, and/or simultaneous localization and mapping (SLAM) techniques. For instance, compute components 214 can perform SLAM or can be in communication (wired or wireless) with a SLAM system (not shown). SLAM refers to a class of techniques where a map of an environment (e.g., a map of an environment being modeled by XR system 200) is created while simultaneously tracking the pose of a camera (e.g., image sensor 202) and/or XR system 200 relative to that map. The map can be referred to as a SLAM map and can be three-dimensional (3D). The SLAM techniques can be performed using color or grayscale image data captured by image sensor 202 (and/or other camera of XR system 200) and can be used to generate estimates of 6DoF pose measurements of image sensor 202 and/or XR system 200. Such a SLAM technique configured to perform 6DoF tracking can be referred to as 6DoF SLAM. In some cases, the output of the one or more sensors (e.g., accelerometer 204, gyroscope 206, one or more IMUs, and/or other sensors) can be used to estimate, correct, and/or otherwise adjust the estimated pose.

It may be beneficial to increase the efficiency of processing image data captured by image sensor 202. For example, image sensor 202 may capture raw image data and ISP 222 (which may be implemented on an HMD and/or on a companion device) may process the raw image data. It may be beneficial to the operation of XR system 200 to reduce the size of the captured image data (e.g., by reducing the resolution of non-region of interest (ROI) portions of the image data) to conserve power, bandwidth and/or processing time within XR system 200.

Figure 3:
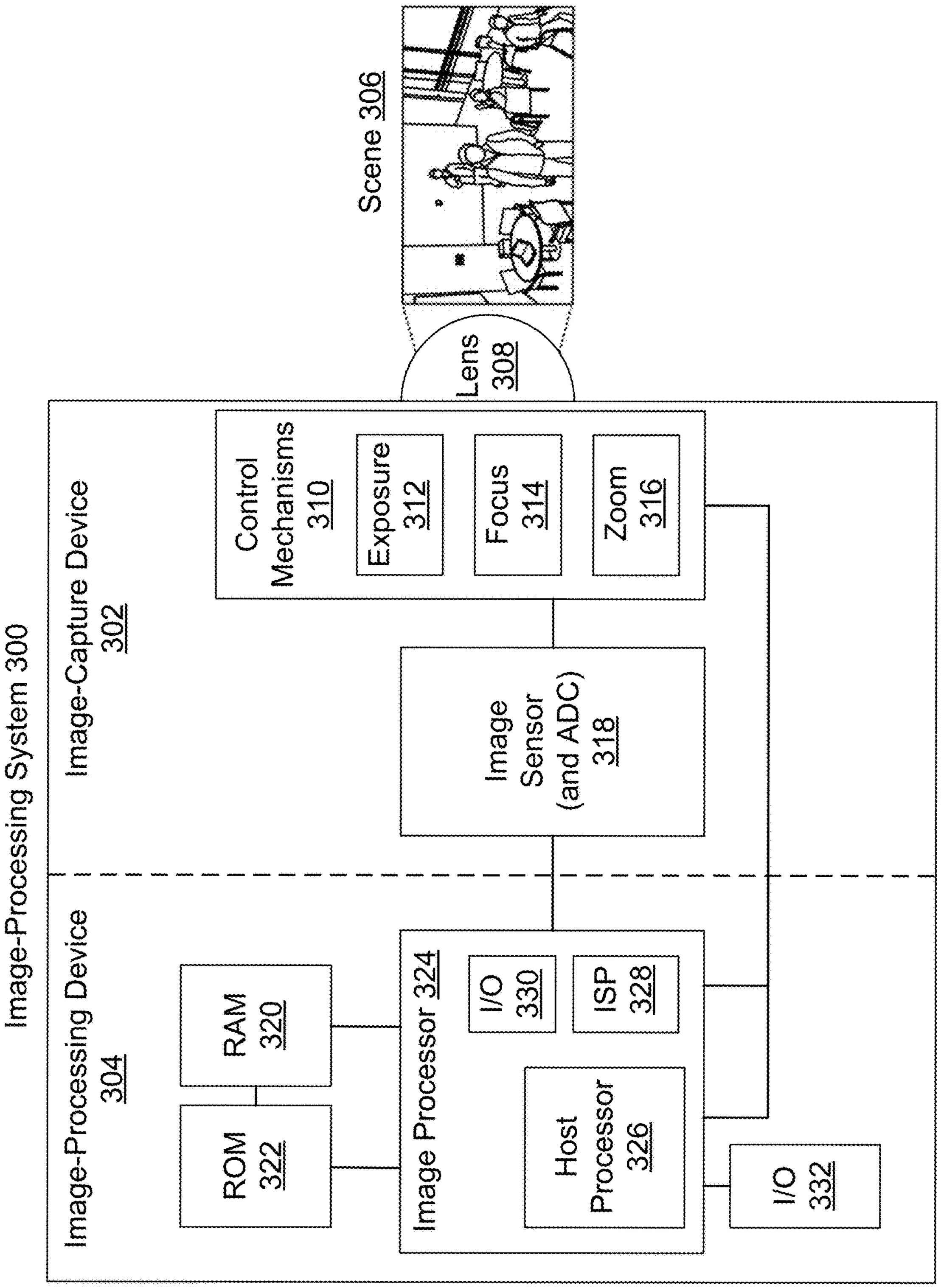
FIG. 3 is a block diagram illustrating an example architecture of an image processing system, according to various aspects of the present disclosure.

FIG. 3 is a block diagram illustrating an example architecture of an image-processing system 300, according to various aspects of the present disclosure. The image-processing system 300 includes various components that are used to capture and process images, such as an image of a scene 306. The image-processing system 300 can capture image frames (e.g., still images or video frames). In some cases, the lens 308 and image sensor 318 (which may include an analog-to-digital converter (ADC)) can be associated with an optical axis. In one illustrative example, the photosensitive area of the image sensor 318 (e.g., the photodiodes) and the lens 308 can both be centered on the optical axis.

The image-processing system 300 can be part of, or implemented by, a single computing device or multiple computing devices. In some examples, the image-processing system 300 can be part of an electronic device (or devices) such as a camera system (e.g., a digital camera, an IP camera, a video camera, a security camera, etc.), a telephone system (e.g., a smartphone, a cellular telephone, a conferencing system, etc.), a laptop or notebook computer, a tablet computer, a set-top box, a smart television, a display device, a game console, an XR device (e.g., an HMD, smart glasses, etc.), an IoT (Internet-of-Things) device, a smart wearable device, a video streaming device, an Internet Protocol (IP) camera, or any other suitable electronic device(s). For example, image-processing system 300 may be implemented in XR system 100 of FIG. 1 or in XR system 200 of FIG. 2. For instance, image-capture device 302 may be an example of image sensor 202 of FIG. 2 and image-processing device 304 may be implemented in compute components 214 of FIG. 2.

In some examples, the lens 308 of the image-processing system 300 faces a scene 306 and receives light from the scene 306. The lens 308 bends incoming light from the scene toward the image sensor 318. The light received by the lens 308 then passes through an aperture of the image-processing system 300. In some cases, the aperture (e.g., the aperture size) is controlled by one or more control mechanisms 310. In other cases, the aperture can have a fixed size.

The one or more control mechanisms 310 can control exposure, focus, and/or zoom based on information from the image sensor 318 and/or information from the image processor 324. In some cases, the one or more control mechanisms 310 can include multiple mechanisms and components. For example, the control mechanisms 310 can include one or more exposure-control mechanisms 312, one or more focus-control mechanisms 314, and/or one or more zoom-control mechanisms 316. The one or more control mechanisms 310 may also include additional control mechanisms besides those illustrated in FIG. 3. For example, in some cases, the one or more control mechanisms 310 can include control mechanisms for controlling analog gain, flash, HDR, depth of field, and/or other image capture properties.

The focus-control mechanism 314 of the control mechanisms 310 can obtain a focus setting. In some examples, focus-control mechanism 314 stores the focus setting in a memory register. Based on the focus setting, the focus-control mechanism 314 can adjust the position of the lens 308 relative to the position of the image sensor 318. For example, based on the focus setting, the focus-control mechanism 314 can move the lens 308 closer to the image sensor 318 or farther from the image sensor 318 by actuating a motor or servo (or other lens mechanism), thereby adjusting the focus. In some cases, additional lenses may be included in the image-processing system 300. For example, the image-processing system 300 can include one or more microlenses over each photodiode of the image sensor 318. The microlenses can each bend the light received from the lens 308 toward the corresponding photodiode before the light reaches the photodiode.

In some examples, the focus setting may be determined via contrast detection autofocus (CDAF), phase detection autofocus (PDAF), hybrid autofocus (HAF), or some combination thereof. The focus setting may be determined using the control mechanism 310, the image sensor 318, and/or the image processor 324. The focus setting may be referred to as an image capture setting and/or an image processing setting. In some cases, the lens 308 can be fixed relative to the image sensor and the focus-control mechanism 314.

The exposure-control mechanism 312 of the control mechanisms 310 can obtain an exposure setting. In some cases, the exposure-control mechanism 312 stores the exposure setting in a memory register. Based on the exposure setting, the exposure-control mechanism 312 can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 318 (e.g., ISO speed or film speed), analog gain applied by the image sensor 318, or any combination thereof. The exposure setting may be referred to as an image capture setting and/or an image processing setting.

The zoom-control mechanism 316 of the control mechanisms 310 can obtain a zoom setting. In some examples, the zoom-control mechanism 316 stores the zoom setting in a memory register. Based on the zoom setting, the zoom-control mechanism 316 can control a focal length of an assembly of lens elements (lens assembly) that includes the lens 308 and one or more additional lenses. For example, the zoom-control mechanism 316 can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 308 in some cases) that receives the light from the scene 306 first, with the light then passing through a focal zoom system between the focusing lens (e.g., lens 308) and the image sensor 318 before the light reaches the image sensor 318. The focal zoom system may, in some cases, include two positive (e.g., converging, convex) lenses of equal or similar focal length (e.g., within a threshold difference of one another) with a negative (e.g., diverging, concave) lens between them. In some cases, the zoom-control mechanism 316 moves one or more of the lenses in the focal zoom system, such as the negative lens and one or both of the positive lenses. In some cases, zoom-control mechanism 316 can control the zoom by capturing an image from an image sensor of a plurality of image sensors (e.g., including image sensor 318) with a zoom corresponding to the zoom setting. For example, the image-processing system 300 can include a wide-angle image sensor with a relatively low zoom and a telephoto image sensor with a greater zoom. In some cases, based on the selected zoom setting, the zoom-control mechanism 316 can capture images from a corresponding sensor.

The image sensor 318 includes one or more arrays of photodiodes or other photosensitive elements. Each photodiode measures an amount of light that eventually corresponds to a particular pixel in the image produced by the image sensor 318. In some cases, different photodiodes may be covered by different filters. In some cases, different photodiodes can be covered in color filters, and may thus measure light matching the color of the filter covering the photodiode. Various color filter arrays can be used such as, for example and without limitation, a Bayer color filter array, a quad color filter array (QCFA), and/or any other color filter array.

In some cases, the image sensor 318 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 318 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 310 may be included instead or additionally in the image sensor 318. The image sensor 318 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 12:
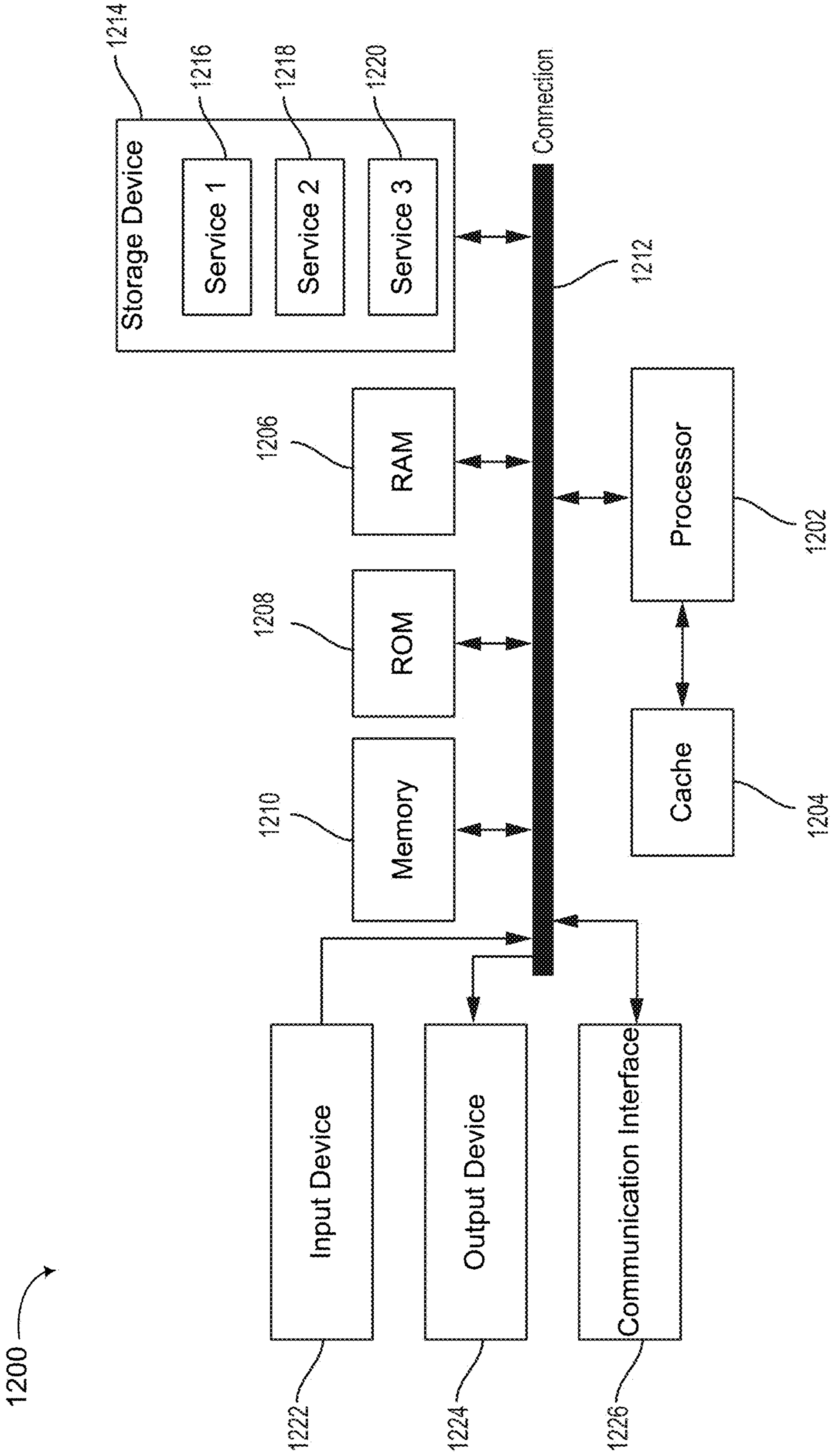
FIG. 12 is a block diagram illustrating an example computing-device architecture of an example computing device which can implement the various techniques described herein.

The image processor 324 may include one or more processors, such as one or more image signal processors (ISPs) (including ISP 328), one or more host processors (including host processor 326), and/or one or more of any other type of processor discussed with respect to the computing-device architecture 1200 of FIG. 12. The host processor 326 can be a digital signal processor (DSP) and/or other type of processor. In some implementations, the image processor 324 is a single integrated circuit or chip (e.g., referred to as a system-on-chip or SoC) that includes the host processor 326 and the ISP 328. In some cases, the chip can also include one or more input/output ports (e.g., input/output (I/O) ports 330), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 330 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General-Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 326 can communicate with the image sensor 318 using an I2C port, and the ISP 328 can communicate with the image sensor 318 using an MIPI port.

The image processor 324 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 324 may store image frames and/or processed images in random-access memory (RAM) 320, read-only memory (ROM) 322, a cache, a memory unit, another storage device, or some combination thereof.

Various input/output (I/O) devices 332 may be connected to the image processor 324. The I/O devices 332 can include a display screen, a keyboard, a keypad, a touchscreen, a trackpad, a touch-sensitive surface, a printer, any other output devices, any other input devices, or any combination thereof. In some cases, a caption may be input into the image-processing device 304 through a physical keyboard or keypad of the I/O devices 332, or through a virtual keyboard or keypad of a touchscreen of the I/O devices 332. The I/O devices 332 may include one or more ports, jacks, or other connectors that enable a wired connection between the image-processing system 300 and one or more peripheral devices, over which the image-processing system 300 may receive data from the one or more peripheral device and/or transmit data to the one or more peripheral devices. The I/O devices 332 may include one or more wireless transceivers that enable a wireless connection between the image-processing system 300 and one or more peripheral devices, over which the image-processing system 300 may receive data from the one or more peripheral device and/or transmit data to the one or more peripheral devices. The peripheral devices may include any of the previously-discussed types of the I/O devices 332 and may themselves be considered I/O devices 332 once they are coupled to the ports, jacks, wireless transceivers, or other wired and/or wireless connectors.

In some cases, the image-processing system 300 may be a single device. In some cases, the image-processing system 300 may be two or more separate devices, including an image-capture device 302 (e.g., a camera) and an image-processing device 304 (e.g., a computing device coupled to the camera). In some implementations, the image-capture device 302 and the image-capture device 302 may be coupled together, for example via one or more wires, cables, or other electrical connectors, and/or wirelessly via one or more wireless transceivers. In some implementations, the image-capture device 302 and the image-processing device 304 may be disconnected from one another.

As shown in FIG. 3, a vertical dashed line divides the image-processing system 300 of FIG. 3 into two portions that represent the image-capture device 302 and the image-processing device 304, respectively. The image-capture device 302 includes the lens 308, control mechanisms 310, and the image sensor 318. The image-processing device 304 includes the image processor 324 (including the ISP 328 and the host processor 326), the RAM 320, the ROM 322, and the I/O device 332. In some cases, certain components illustrated in the image-capture device 302, such as the ISP 328 and/or the host processor 326, may be included in the image-capture device 302. In some examples, the image-processing system 300 can include one or more wireless transceivers for wireless communications, such as cellular network communications, 802.11 wi-fi communications, wireless local area network (WLAN) communications, or some combination thereof.

While the image-processing system 300 is shown to include certain components, one of ordinary skill will appreciate that the image-processing system 300 can include more components than those shown in FIG. 3. The components of the image-processing system 300 can include software, hardware, or one or more combinations of software and hardware. For example, in some implementations, the components of the image-processing system 300 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image-processing system 300.

In some examples, the computing-device architecture 1200 shown in FIG. 12 and further described below can include the image-processing system 300, the image-capture device 302, the image-processing device 304, or a combination thereof.

It may be beneficial to increase the efficiency of processing image data captured by image-capture device 302. For example, image-capture device 302 may capture image data and image processor 324 may process the image data. It may be beneficial to the operation of image-processing system 300 to reduce the size of the captured image data (e.g., by reducing the resolution of non-region of interest (ROI) portions of the image data) to conserve power, bandwidth and/or processing time within image-processing system 300.

Figure 4:
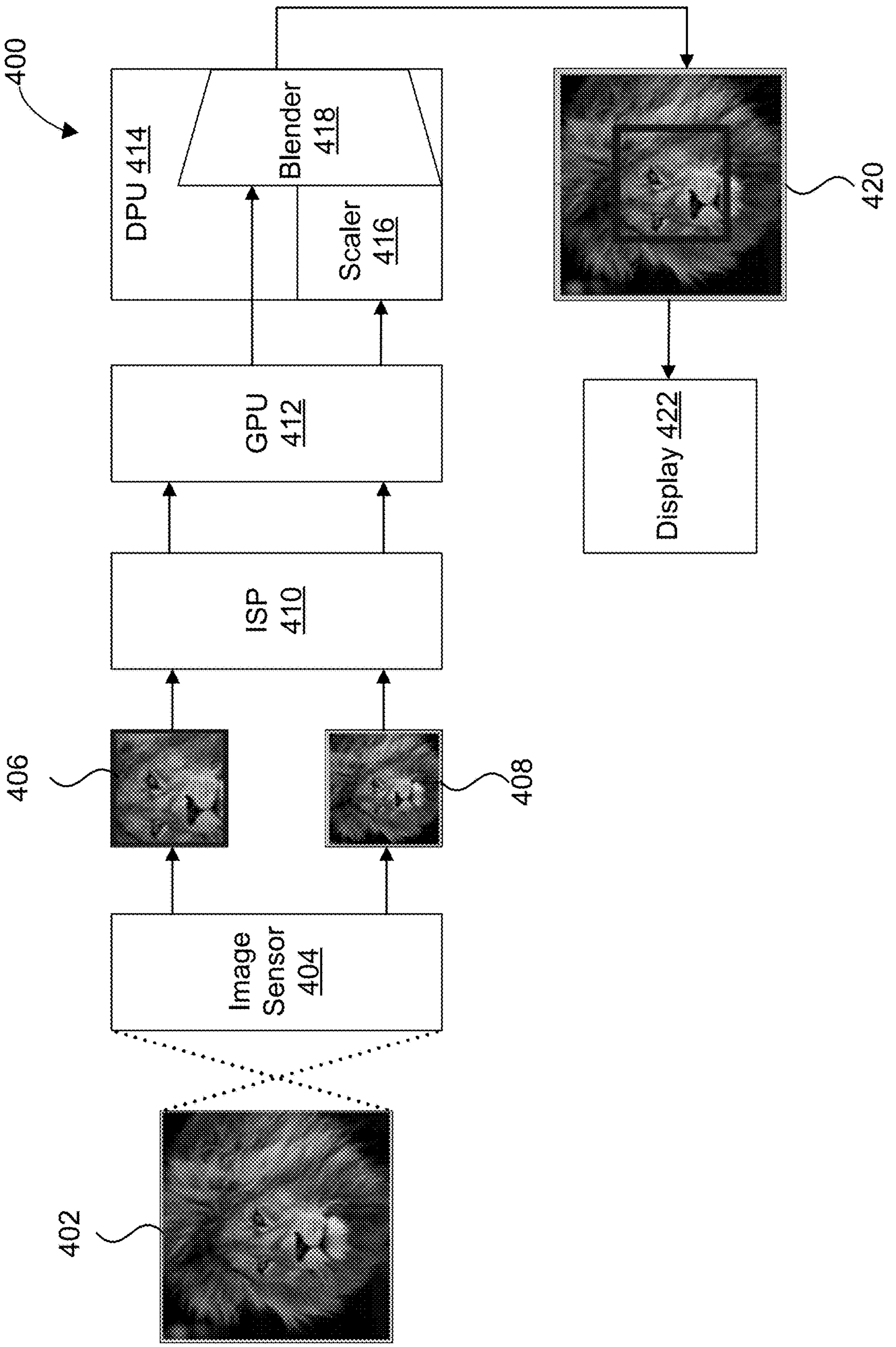
FIG. 4 is a diagram illustrating an example system that may be used to efficiently process image data, according to various aspects of the present disclosure.

FIG. 4 is a diagram illustrating an example system 400 that may be used to efficiently process image data, according to various aspects of the present disclosure. For example, an image sensor 404 may capture image data 406 and image data 408. Both image sensor 404 and image data 406 may be representative of a scene 402. Image data 406 may represent a region of interest (ROI) of scene 402 and may have a higher resolution than image data 408. Image data 408 may represent a larger field of view of scene 402 and may have a lower resolution than image data 406. System 400 may process image data 406 and image data 408 at an image signal processor (ISP) 410, a graphics processing unit (GPU) 412, and/or a data processing unit (DPU) 414. By processing image data 406 and image data 408 at ISP 410, GPU 412, and/or DPU 414 (rather than processing an image representing the field of view of image data 408 at the resolution of image data 406), system 400 may conserve power, bandwidth, and/or processing time.

In further detail, light from scene 402 may by focused onto image sensor 404 (e.g., by a lens). Image sensor 404 may generate image data (e.g., image data 406 and image data 408) representative of a field of view of image sensor 404 of scene 402. In a conventional system, an image sensor may generate one image frame representative of a full field of view of a scene at a single resolution (e.g., at the highest resolution of the image sensor). As an example, in the conventional system, the image sensor may be made up of 16 million individual light sensors. The image sensor may generate one image frame having a single resolution, the image frame may be 16 megabytes in size (e.g., one byte for each of the individual light sensors). Thus, the conventional system may generate one 16 megabyte full-frame image. In contrast, image sensor 404 may generate image data 406 representative of an ROI of scene 402 (and having a first resolution) and image data 408 representative of a region surrounding the ROI (and having a second, lower resolution). For example, image data 406 may represent a quarter of the field of view of image sensor 404 of scene 402 at full resolution. For instance, if image sensor 404 is made up of 16 million individual light sensors, image data 406 may be a 4-megabyte image of a quarter of the field of view of image sensor 404 of scene 402. Further, image data 408 may represent the full field of view of image sensor 404 of scene 402 at one quarter of full resolution. For instance, image data 408 may be a 4-megabyte image of the full field of view of image sensor 404 of scene 402. In such cases, image data 408 may include one byte of data for every four individual light sensors. For example, intensity data from groups of four light sensors may be downsampled or averaged to reduce the resolution of image data 408. According to such an example, system 400 may process (e.g., at ISP 410 and beyond) 8 megabytes worth of image data (e.g., image data 406, which may be a 4-megabyte image and image data 408 which may be a 4-megabyte image). In contrast, the example conventional system may process 16 megabytes worth of image data. In this way (e.g., by capturing a full resolution image of an ROI and a full frame image at one quarter resolution), system 400 may reduce the image-data processing load of system 400 as compared with conventional image-capture-and-processing systems.

The scalings provided in the above example are examples. In other cases, other scalings may be used. For example, image data 406 may represent any fraction of the field of view of image sensor 404 of scene 402 (e.g., image data 406 may represent one half, one third, one fifth, one sixth, etc. of the field of view of image sensor 404 of scene 402). Additionally, or alternatively, image data 408 may have any resolution, less than the full resolution of which image sensor 404 is capable. For example, image data 408 may be 75%, 50%, 25%, 12.5%, etc. of the full resolution of image sensor 404. Additionally, or alternatively, in some cases, image data 408 may exclude the ROI. For example, the portion of the field of view of scene 402 captured by image data 406 may be omitted from image data 408. Additionally, or alternatively, in some cases, image sensor 404 may capture more than two images of scene 402. For example, image sensor 404 may capture a first image of the ROI at 100% resolution (e.g., image data 406), a second image of a peripheral region (e.g., surrounding the ROI but not extending to the edges of the field of view of scene 402, such as a ring or box surrounding the ROI) at 50% resolution, and a third image of the remainder of the field of view of scene 402 at 25% resolution.

System 400 may process image data 406 and image data 408 at ISP 410. ISP 410 may be, or may include, any number of individual ISPs. ISP 222 of FIG. 2, image processor 324 of FIG. 3, and/or ISP 328 of FIG. 3 may be examples of ISP 410. ISP 410 may include a frontend portion that may receive image data 406 and image data 408 from image sensor 404 and may process image data 406 and image data 408 as image data 406 and image data 408 are received (e.g., line-by-line as each line is received or portion-by-portion as each portion is received). ISP 410 may further include a backend portion and a memory. The frontend portion may store processed image data in the memory and the backend portion may read the processed image data from the memory and further process the read image data. By decreasing the total size of image data to be processed by ISP 410 (by decreasing a frame-size of image data 406 compared with a full-frame image and a resolution of image data 408 compared with a full-resolution image), system 400 may conserve power, bandwidth, and/or processing time at ISP 410.

In some cases, system 400 may process image data 406 and image data 408 (e.g., after having been processed at ISP 410) at GPU 412. GPU 218 of FIG. 2 may be an example of GPU 412. Similar to what was described with regard to ISP 410, by decreasing the total size of image data to be processed by GPU 412, system 400 may conserve power, bandwidth, and/or processing time at GPU 412. GPU 412 is optional in system 400. For example, in some cases, system 400 may omit GPU 412. In other cases, ISP 410 may be omitted and GPU 412 may process image data 406 and image data 408 and may conserve power, bandwidth, and/or processing time based on the decreased total size of image data processed.

Additionally, or alternatively, in some cases, system 400 may process image data 406 and image data 408 (e.g., after having been processed at ISP 410 and/or GPU 412) at DPU 414. Compute components 214 of FIG. 2 may include an instance of DPU 414. Similar to what was described with regard to ISP 410, by decreasing the total size of image data to be processed by DPU 414, system 400 may conserve power, bandwidth, and/or processing time at DPU 414. Similar to ISP 410, GPU 412 is optional in system 400. For example, in some cases, system 400 may omit DPU 414. In other cases, ISP 410 and/or GPU 412 may be omitted and DPU 414 may process image data 406 and image data 408 and may conserve power, bandwidth, and/or processing time based on the decreased total size of image data processed.

In some cases, DPU 414 may generate image data 420, which may be a composite image, including data of image data 406 and data of image data 408. For example, DPU 414 may include a scaler 416 and a blender 418. Scaler 416 may scale image data 408 (e.g., as processed by ISP 410 and/or GPU 412). For example, image data 408 may have only a fraction of the total number of pixels of a full-frame full-resolution image (e.g., based on image data 408 being captured at a fraction of the full-resolution capability of image sensor 404). Scaler 416 may scale image data 408 up by increasing the number of pixels of image data 408. Blender 418 may combine image data 406 (e.g., as processed by ISP 410 and/or GPU 412) with image data 408 (e.g., as upscaled by scaler 416). For example, blender 418 may insert image data 406 into image data 408 (as upscaled by scaler 416). Further, blender 418 may blend pixels at edges of image data 406 (e.g., such that the interface between the edges of image data 406 and image data 408 are less distinct).

System 400 may display image data 420 (e.g., at a display 422), store image data 420 (e.g., for later display and/or processing), transmit image data 420 (e.g., for display, storage, and/or processing by another system or device), and/or process image data 420. Processing image data 420 may include using image data 420 in performing operations related to object detection, image recognition (e.g., face recognition, object recognition, scene recognition, etc.), feature extraction, authentication, and automation, among others.

As mentioned above, it may be important to coordinate operations of image sensor 404 (in generating image data 406 and image data 408) with operations of ISP 410 (in processing image data 406 and image data 408). For example, ISP 410 may be configured to process image data (e.g., image data 406 and image data 408) as the image data is received from image sensor 404. For ISP 410 to correctly process image data 406 and image data 408, it may be important for ISP 410 to be informed of certain information regarding image data 406 and image data 408. For example, some operations of ISP 410 may be based, at least in part, on a position of the ROI of image data 406 within the larger frame of image data 408. For instance, lens-shading correction operations may be based, at least in part, on where the pixels being processed are within the frame. As an example, if an ROI is on a left side of a frame of an image (e.g., if image data 406 represented a portion on the left of image data 408), lens-correction shading may operate differently on pixels on the left side of the ROI than pixels on the right side of the ROI. To correctly process image data 406 and/or image data 408, it may be important for ISP 410 to know the relationship between image data 406 and image data 408 (e.g., a position of the ROI on which image data 406 is based relative to image data 408).

Figure 5:
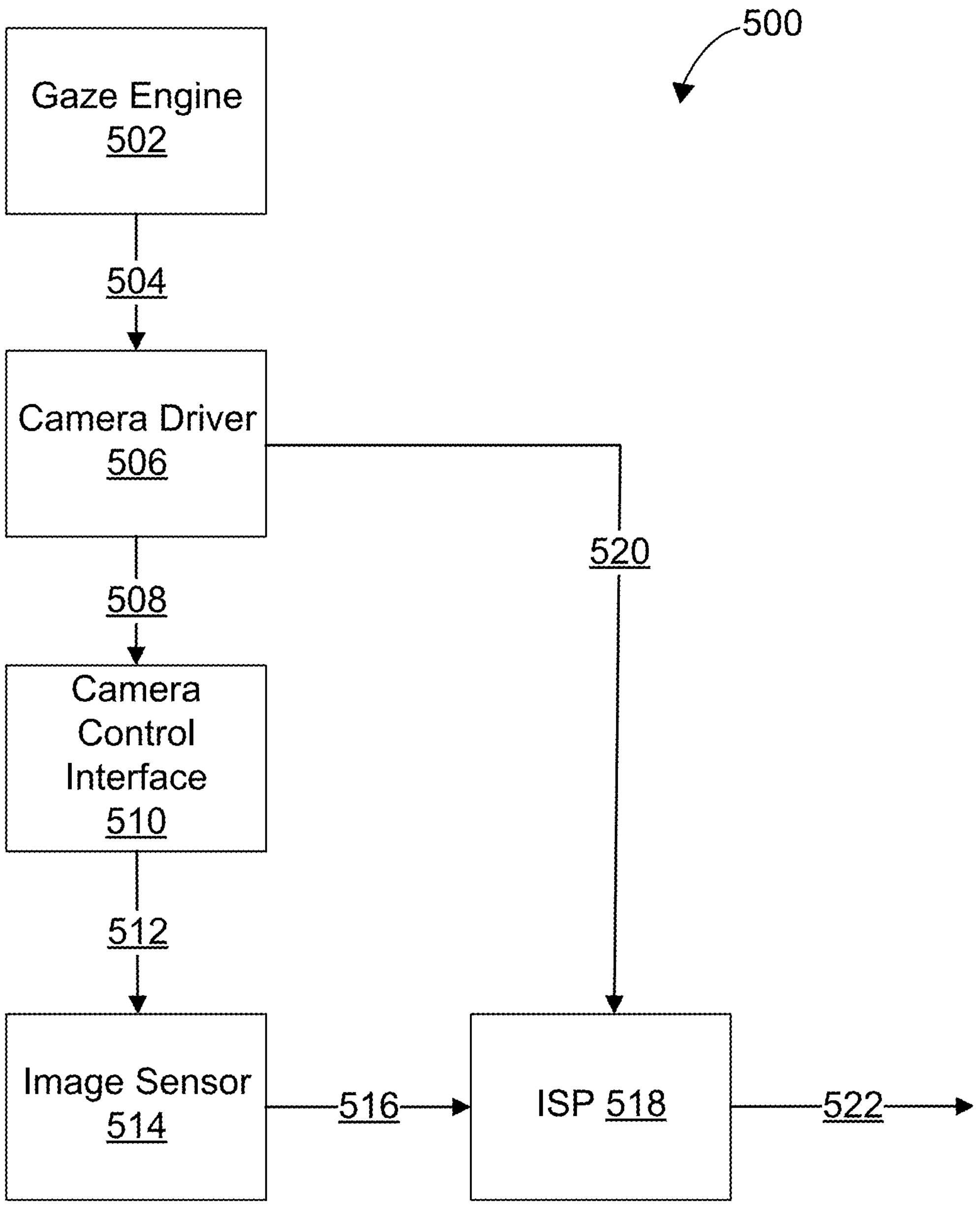
FIG. 5 is a block diagram illustrating an example system for processing image data.

FIG. 5 is a block diagram illustrating an example system 500 for processing image data. System 500 provides a ROI indicator 520 to ISP 518 such that ISP 518 may correctly process image data 516. Image sensor 514 may be an example of image sensor 404 of FIG. 4. Image data 516 may be an example of image data 406 and/or image data 408 of FIG. 4. ISP 518 may be an example of ISP 410 of FIG. 4.

System 500 includes a gaze engine 502 which may determine an ROI based on a gaze of a viewer. For example, gaze engine 502 may receive data from a gaze-tracking sensor and determine and/or predict a gaze of the viewer. Gaze engine 502 may generate a ROI indicator 504 indicative of the ROI based on the gaze of the viewer.

Gaze engine 502 may provide ROI indicator 504 to a camera driver 506. Camera driver 506. Camera driver 506 may control at least some operations of image sensor 514 and/or ISP 518. For example, camera driver 506 may determine and/or set image-capture settings used by image sensor 514 to capture image data 516. Additionally, or alternatively, camera driver 506 may determine and/or set image-processing settings used by ISP 518 to process image data 516.

Camera driver 506 may provide ROI indicator 508 (which may be the same as, or may be a reformatted version of, ROI indicator 504) to camera control interface 510. Camera control interface 510 may be an interface between camera driver 506 and image sensor 514. Camera control interface 510 may control operations of image sensor 514 (e.g., at the direction of camera driver 506 and/or more directly than camera driver 506 controls the operation of image sensor 514). Camera control interface 510 may provide ROI indicator 512 (which may be the same as, or may be a reformatted version of, ROI indicator 508) to image sensor 514.

Image sensor 514 may generate image data 516 based on ROI indicator 512. For example, ROI indicator 512 may indicate an ROI within a field of view of image sensor 514. Image sensor 514 may capture image data representing the ROI at a first resolution (e.g., at the highest resolution of image sensor 514). Additionally, image sensor 514 may capture image data outside the ROI and within the field of view of image sensor 514 at a second, lower resolution. For example, image sensor 514 may capture image data 406 and image data 408 of FIG. 4 based on ROI indicator 512. Image sensor 514 may provide image data 516 (including image data captured based on ROI indicator 512) to ISP 518.

ISP 518 may process image data 516 to generate image data 522. ISP 518 may include a frontend portion that may process image data 516 as it is received from image sensor 514. Camera driver 506 may provide ROI indicator 520 (which may be the same as, or may be a reformatted version of, ROI indicator 504) to ISP 518. ISP 518 may process image data 516 based on ROI indicator 520. For example, ISP 518 may perform operations related to lens-shading correction and may use ROI indicator 520 to determine how to perform the lens-shading correction on image data 516.

Camera driver 506 providing ROI indicator 520 to ISP 518 is an example of informing ISP 518 of ROI such that ISP 518 can process image data 516 based on the ROI. However, there are challenges inherent in the example of system 500. Due to multi-threaded nature of software and the fact that many tasks may run in parallel (e.g., in ISP 518), one challenge inherent in the example of system 500 is ensuring that image data 516 matches with the configuration of ISP 518 (e.g., based on ROI indicator 520). This challenge is especially challenging when image sensor 514 captures image data 516 at a high frame rate. For example, a delay in capturing and/or processing image data 516 (e.g., at image sensor 514 and/or an ISP engine of ISP 518) may cause image data 516 to be out of sync with ROI indicator 520. For example, ISP 518 may adjust its image-processing settings based on a ROI indicator 520 that does not correspond to image data 516 that is arriving at ISP 518.

Figure 6A:
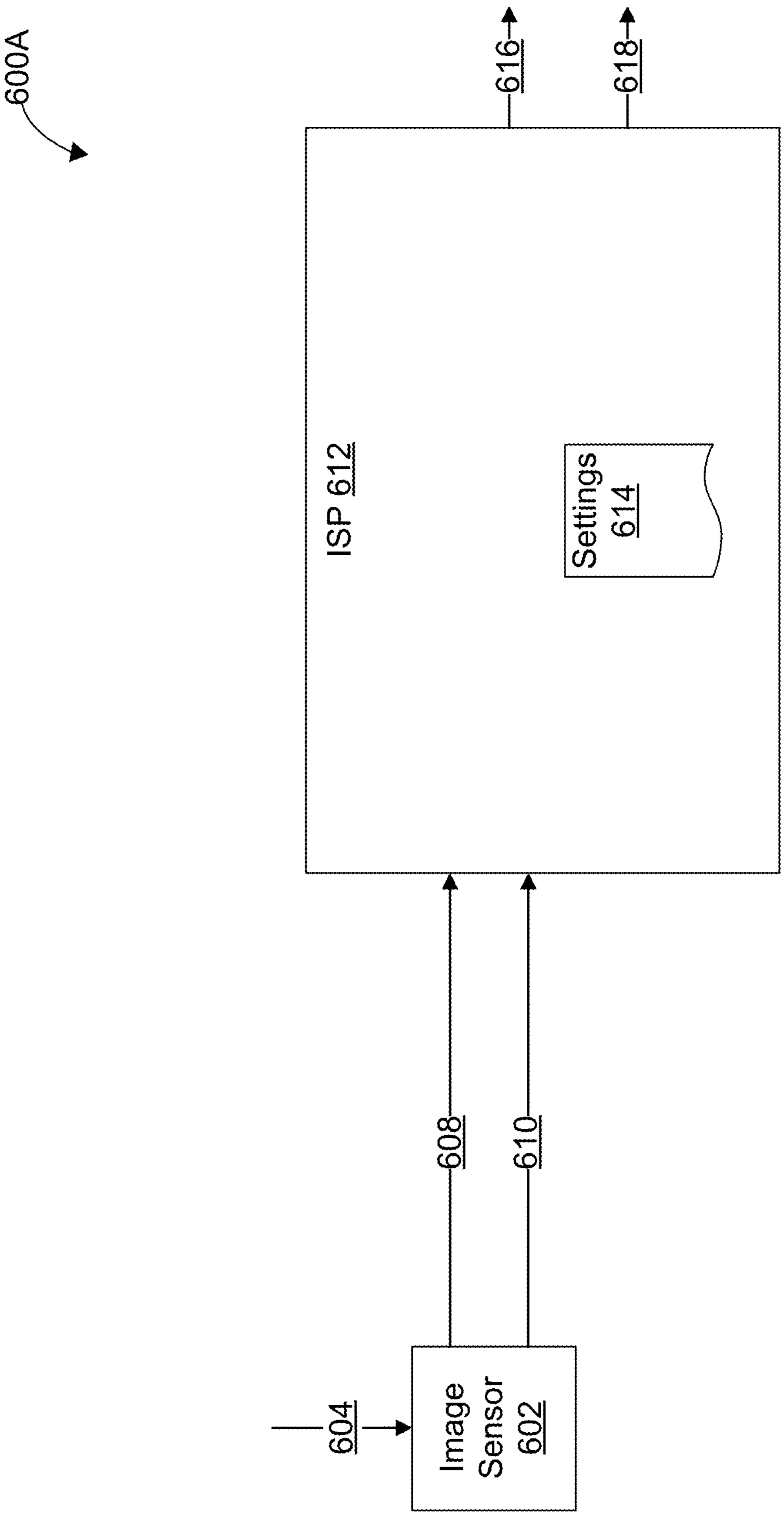
FIG. 6A is a block diagram illustrating an example system for efficiently processing image data, according to various aspects of the present disclosure.

FIG. 6A is a block diagram illustrating an example system 600A for efficiently processing image data 610, according to various aspects of the present disclosure. System 600A includes an image sensor 602 that may generate image data 610 based on a region of interest (ROI). Further, system 600A includes an image signal processor (ISP) 612 that may process image data 610 based on the ROI.

For example, image sensor 602 may receive ROI indicator 604. ROI indicator 604 may be generated based on a gaze of a viewer (e.g., by gaze engine 502 of FIG. 5). ROI indicator 604 may be an indication of the ROI within a field of view of image sensor 602. Image sensor 602 may generate image data 610 based on the ROI. Image sensor 602 may be similar to and/or may perform substantially the same operations as image sensor 514 of FIG. 5. For example, image sensor 602 may generate a first image of the ROI at a first resolution (e.g., a full resolution of image sensor 602) and a second image of the region surrounding the ROI at a second, lower resolution. For example, image sensor 602 may generate image data 406 and image data 408 of FIG. 4. Image data 610 may be the same as, or may be substantially similar to, image data 516 of FIG. 5 (e.g., including image data 406 and image data 408).

However, unlike image sensor 514, image sensor 602 may provide ROI indicator 608 to ISP 612. ROI indicator 608 may be an indication of the position of the ROI with relation to the field of view of image sensor 602. For example, ROI indicator 608 may be an indication where the ROI is within the field of view of image sensor 602. Additionally, or alternatively, ROI indicator 608 may describe a relationship between image frames. For example, where image data 610 includes image data 406 and image data 408, ROI indicator 608 may describe the relationship between image data 406 and image data 408. In some cases, ROI indicator 608 may be the same as, or may be substantially similar to, ROI indicator 604. In other cases, ROI indicator 608 may be include the same information as ROI indicator 604 but may be formatted in a different way.

ISP 612 may process image data 610 based on the ROI as indicated by ROI indicator 608. ISP 612 may perform one or more operations related to Bad Pixel Correction (BPC), lens correction, lens-shading correction, phase-detection pixel correction, demosaicing, lateral chromatic aberration correction, Bayer filtering, adaptive Bayer filtering, tone mapping, noise reduction, etc. ISP 612 may perform the some of the one or more operations based on the ROI as indicated by ROI indicator 608. For example, ISP 612 may generate settings 614 based on the ROI and process image data 610 based on settings 614. ISP 612 may generate and/or output image data 616 (which may be image data 610 processed). Additionally or alternatively, ISP 612 may output ROI indicator 618 (which may be the same as ROI indicator 608 or which may be a reformatted version of ROI indicator 608).

Figure 6B:
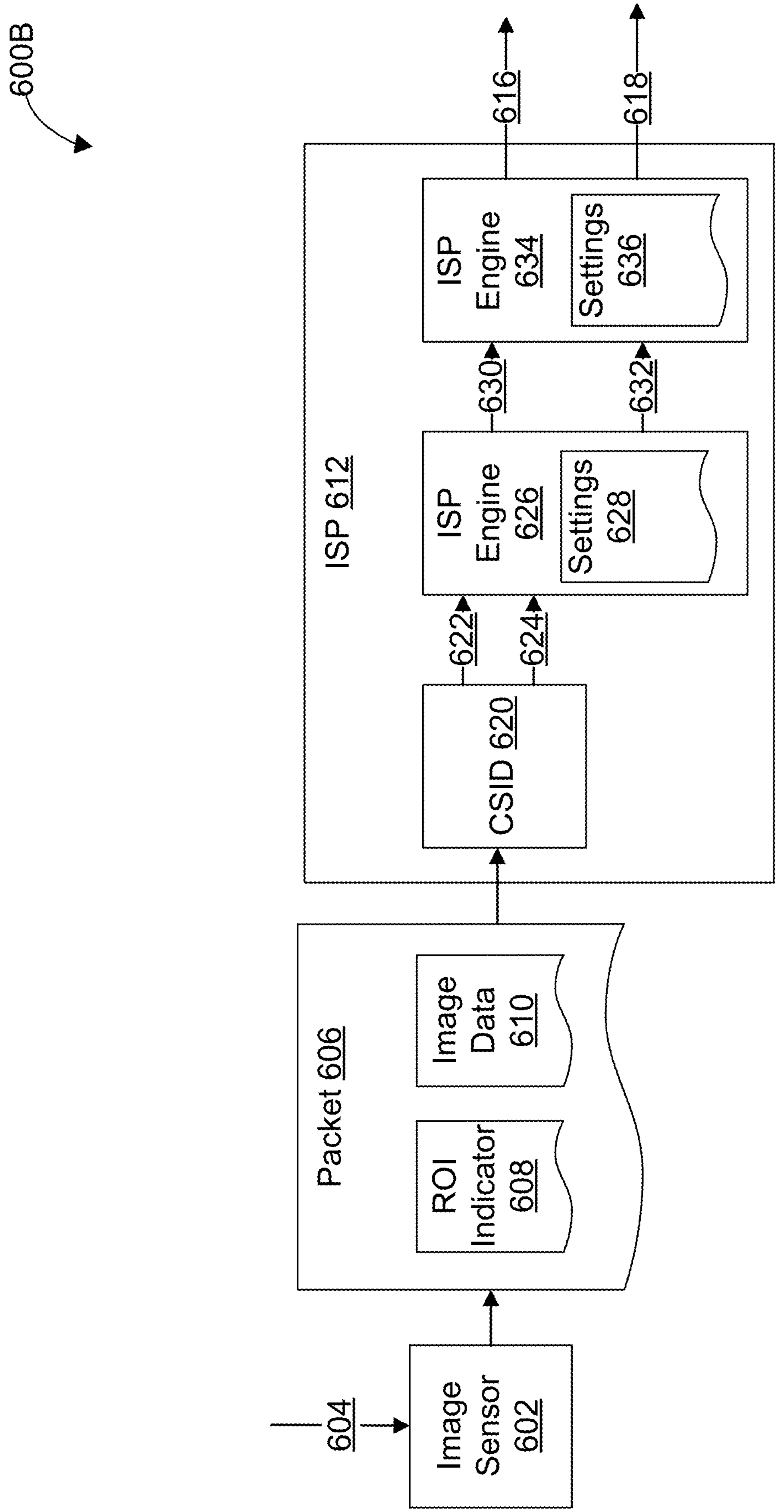
FIG. 6B is a block diagram illustrating an example system for efficiently processing image data, according to various aspects of the present disclosure.

FIG. 6B is a block diagram illustrating an example system 600B for efficiently processing image data 610, according to various aspects of the present disclosure. System 600B may be an example of system 600A of FIG. 6A. For example, system 600B may be the same as, may be substantially similar to, and/or may perform the same, or substantially the same, operations as system 600A, yet system 600B may include examples of details according to one example aspect of system 600A.

For example, according to the example aspect of system 600B, image sensor 602 may provide ROI indicator 608 and image data 610 to ISP 612 in a packet 606. For example, image sensor 602 may generate packet 606 including image data 610 and ROI indicator 608 and provide packet 606 to ISP 612. Image sensor 602 may be coupled to ISP 612 at an interface (e.g., a Mobile Industry Processor Interface (MIPI)). Accordingly, packet 606 may be a MIPI packet.

According to the example aspect of system 600B, ISP 612 may include a camera serial interface (CSI) decoder (CSID 620). CSID 620 may receive image data 610 and ROI indicator 608 from image sensor 602 (e.g., in packet 606). CSID 620 may parse packet 606 (e.g., to extract ROI indicator 608 which may include location and size information) and provide image data 624 (which may be a decoded version of image data) and ROI indicator 622 (which may be the same as ROI indicator 608 or which may be a reformatted version of ROI indicator 608) to an ISP engine 626 of ISP 612. To reduce wiring cost, the control plane can be interleaved with the data plane.

Additionally or alternatively, according to the example aspect of system 600B, ISP 612 may include multiple ISP engines. ISP 612 may include any number of ISP engines. For simplicity, two ISP engines are illustrated and described with relation to FIG. 6B. In particular, ISP 612 includes ISP engine 626 and ISP engine 634. However, ISP 612 may include any number of ISP engines (e.g., one, three, four, or more). There may be an interface between each of the ISP engines (e.g., between ISP engine 626 and ISP engine 634. Such interfaces may be internal to IPS 612 and may be flexible.

Each of the ISP engines of ISP 612 may receive image data from a prior IPS engine (or from CSID 620), process the received image data, and provide the processing image data to a subsequent ISP engine (or at an output of ISP 612). Further, each of the ISP engines may receive an ROI indicator from a prior ISP engine (or from CSID 620) and process the image data based on the ROI indicator. For example, each of the ISP engines may receive the ROI indicator, determine respective image-processing settings for the ISP engine, and process the image data based on the respective image-processing settings. Further, each of the ISP engines may provide the ROI indicator to a subsequent ISP engine (or at an output of ISP 612). For example, ISP engine 626 may receive ROI indicator 622 and image data 624 from CSID 620. ISP engine 626 may generate settings 628 based on ROI indicator 622 and process image data 624 based on settings 628. Further, ISP engine 626 may provide ROI indicator 630 (which may be the same as ROI indicator 622) and image data 632 (which may be image data 624 as processed by ISP engine 626) to ISP engine 634. As another example, ISP engine 634 may receive ROI indicator 630 and image data 632 from ISP engine 626. ISP engine 634 may generate settings 636 based on ROI indicator 630 and process image data 632 based on settings 636. Further, ISP engine 634 may provide ROI indicator 618 (which may be the same as ROI indicator 630) and image data 616 (which may be image data 632 as processed by ISP engine 634) at an output (or at respective outputs) of ISP 612.

Figure 7:
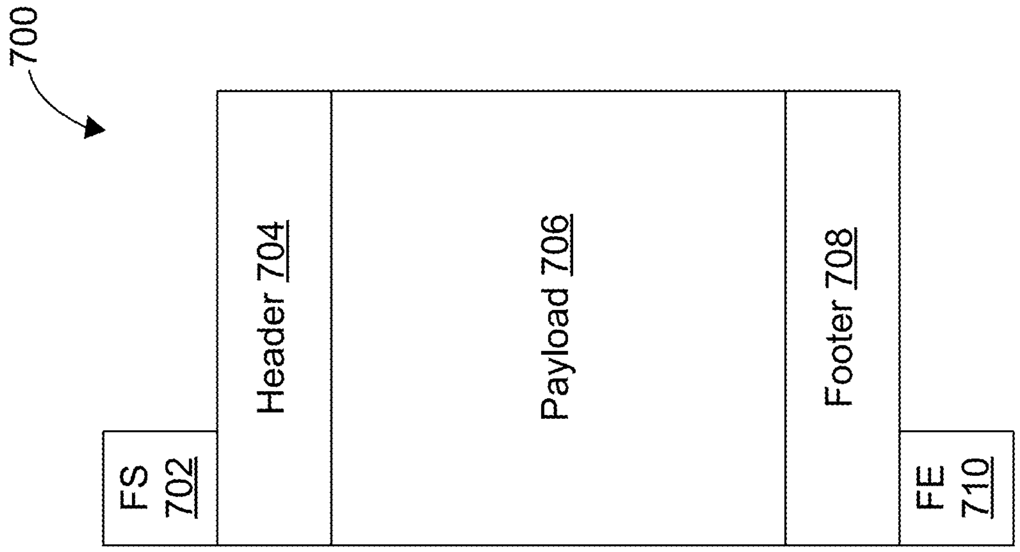
FIG. 7 is a diagram illustrating an example packet that may include image data and an ROI indicator, according to various aspects of the present disclosure.

FIG. 7 is a diagram illustrating an example packet 700 that may include image data and an ROI indicator, according to various aspects of the present disclosure. Packet 700 may be an example of packet 606 of FIG. 6B. Packet 700 may be a MIPI packet.

Packet 700 may include a frame start 702, which may include one or more bits to indicate a start of packet 700. Frame start 702 may be followed by a header 704. Header 704 may include a data identifier, a word count field, and an 8-bit error correction code (BCC). Header 704 may follow a MIPI protocol. Additionally, header 704 may include an ROI indicator. The ROI indicator may relate to image data of payload 706. The ROI indicator may indicate a position and/or size of an ROI in the image data. Header 704 may be followed by payload 706. Payload 706 may include the image data. Payload 706 may be followed by footer 708, which may include a checksum or cyclic redundancy check (CRC). Footer 708 may be followed by a frame end 710, which may include one or more bits to indicate an end of packet 700. According to some terminology, each of frame start 702, header 704, payload 706, footer 708, and frame end 710 may be referred to individually as a packet.

Figure 8:
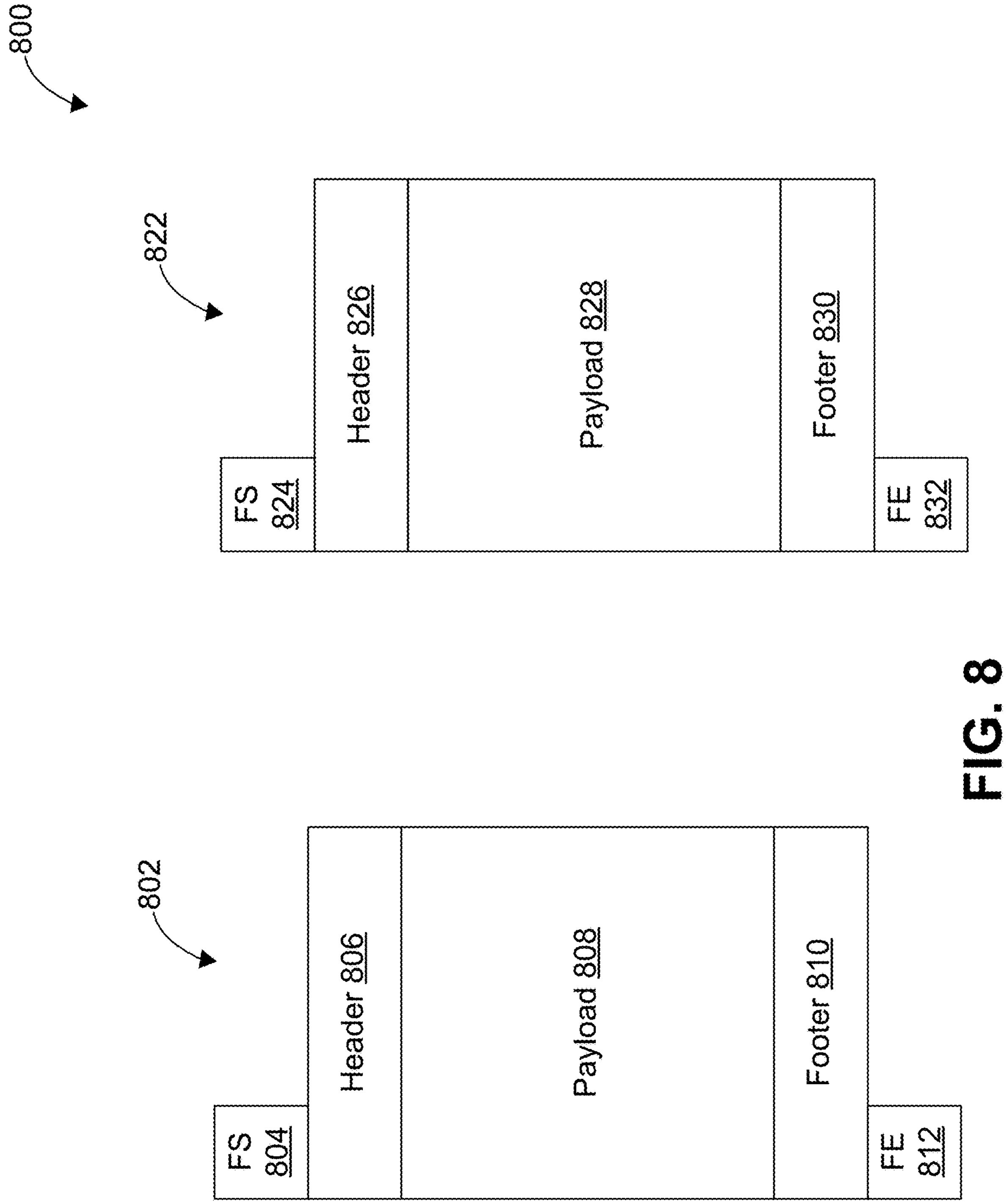
FIG. 8 is a diagram illustrating two example packets that may include image data and ROI indicators, according to various aspects of the present disclosure.

FIG. 8 is a diagram illustrating two example packets 800 that may include image data and ROI indicators, according to various aspects of the present disclosure. Packet 802 and packet 822 may be referred to collectively as packets 800. Packets 800 collectively may provide for a transfer of ROI indicator 608 and image data 610 of FIG. 6A.

Each of packet 802 and packet 822 may be substantially similar to, packet 700 of FIG. 7. For example, packet 802 may include a frame start 804, a header 806, a payload 808, a footer 810, and a frame end 812 and packet 822 may include a frame start 824, a header 826, a payload 828, a footer 830, and a frame end 832. Frame start 804 and frame start 824 may be the same as, or may be substantially similar to, frame start 702. Payload 808 and payload 828 may be the same as, or may be substantially similar to, payload 706. Frame end 812 and frame end 832 may be the same as, or may be substantially similar to, frame end 710. According to some terminology, each of frame start 804, header 806, payload 808, footer 810, frame end 812, frame start 824, header 826, payload 828, footer 830, and frame end 832, may be referred to individually as a packet.

Header 806 and header 826 may be similar to, header 704. However, header 806 and header 826 may, or may not, include the ROI indicator present in header 704. Footer 810 and footer 830 may be similar to footer 708. However, footer 810 and footer 830 may include ROI indicators. For example, each of packets 800 may include an ROI indicator for a subsequent image frame in the footer of the respective packet. For example, if packet 802 precedes packet 822, packet 802, in footer 810, may include an ROI indicator indicative of a position and/or size of the ROI of image data in payload 828. Further, packet 822, in footer 830 may include an ROI indicator indicative of a position and/or size of the ROI of image data of a subsequent frame (not illustrated in FIG. 8).

Figure 9:
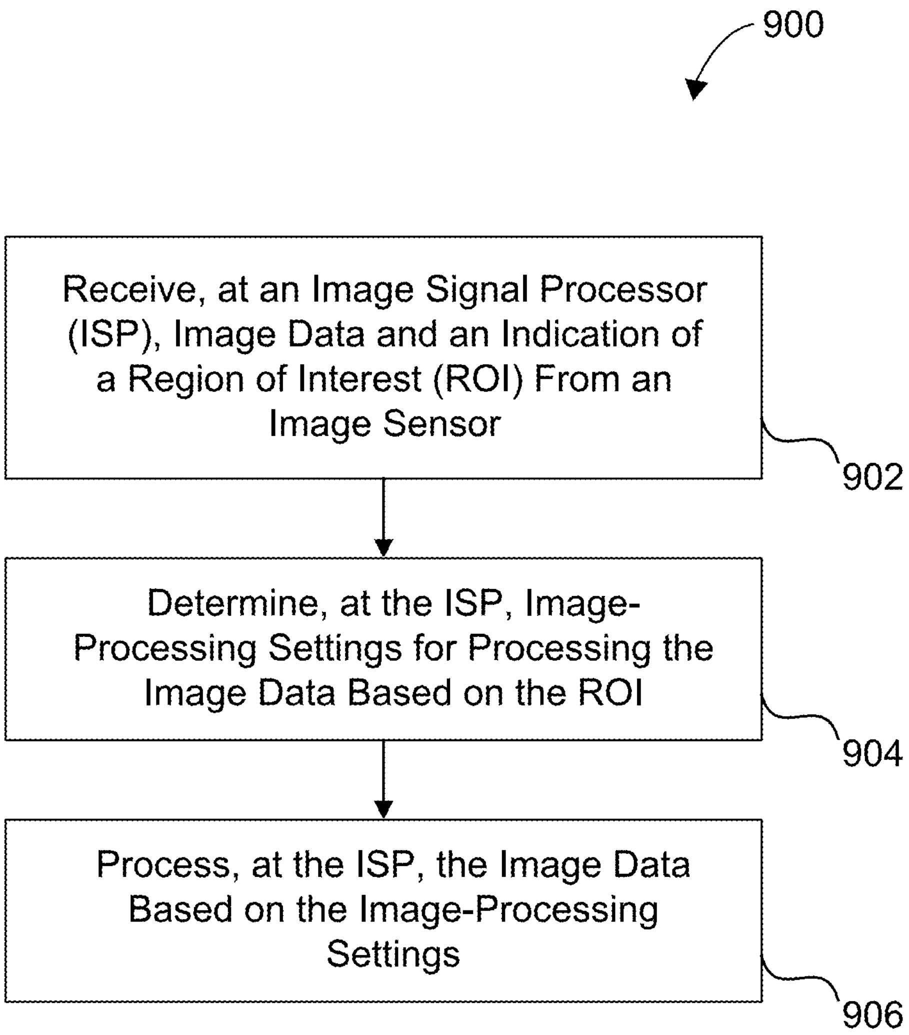
FIG. 9 is a flow diagram illustrating another example process for efficiently processing image data, in accordance with aspects of the present disclosure.

FIG. 9 is a flow diagram illustrating a process 900 for efficiently processing image data, in accordance with aspects of the present disclosure. One or more operations of process 900 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 900. The one or more operations of process 900 may be implemented as software components that are executed and run on one or more processors.

At a block 902, a computing device (or one or more components thereof) (e.g., an image signal processor (ISP) may receive image data and an indication of a region of interest (ROI) from an image sensor. For example, ISP 612 of FIG. 6 may receive packet 606 of FIG. 6, which may include image data 610 and ROI indicator 608.

In some aspects, the computing device (or one or more components thereof) (e.g., the ISP) may include a camera serial interface (CSI) decoder. The CSI decoder may receive a packet comprising the image data and the indication of the ROI from the image sensor; parse the packet; and provide the image data and the indication of the ROI to a subsequent ISP engine of the one or more ISP engines. For example, ISP 612 may include CSID 620. CSID 620 may receive packet 606 from image sensor 602. Packet 606 may include ROI indicator 608 and image data 610. CSID 620 may parse packet 606 and provide ROI indicator 622 and image data 624 to ISP engine 626.

In some aspects, the computing device (or one or more components thereof) (e.g., the ISP) may receive the image data and the indication of the ROI in a packet and the ISP may parse the indication of the ROI from a header of the packet. For example, ISP 612 may receive ROI indicator 608 and image data 610 in packet 606 and may parse ROI indicator 608 from a header of packet 606 (e.g., from header 704 of packet 700 of FIG. 7). In some aspects, the packet may be, or may include, a Mobile Industry Processor Interface (MIPI) packet. For example, packet 606 may be a MIPI packet.

In some aspects, the computing device (or one or more components thereof) (e.g., the ISP) may receive the indication of the ROI in a footer of a first packet, and parse the indication of the ROI from the footer of the first packet, and wherein the ISP is configured to receive the image data in a payload of a second packet. For example, ISP 612 may receive multiple packets 606 and may parse ROI indicator 608 from a first one of the multiple packets 606 and image data 610 from a second one of the multiple packets 606. For example, ISP 612 may receive packets 800 and parse ROI indicator 608 from footer 810 of packet 802 and image data 610 from payload 828 of packet 822.

In some aspects, the indication of the ROI may be a first indication of the ROI. An image sensor of the computing device (or one or more components thereof) (e.g., coupled to the ISP) may receive a second indication of the ROI; generate the image data based on the ROI, and provide the image data and the first indication of the ROI to an image signal processor (ISP). For example, gaze engine 502 of FIG. 5 may determine ROI indicator 504 and provide ROI indicator 504 to camera driver 506, which may in turn provide ROI indicator 508 to camera control interface 510, which may in turn provide ROI indicator 512 to image sensor 514. Image sensor 514 may capture image data 516 based on ROI indicator 512 and may provide image data 516 to ISP 518. Additionally, camera driver 506 may provide ROI indicator 520 (which may correspond to ROI indicator 512 and ROI indicator 504) to ISP 518. In some aspects, the computing device (or one or more components thereof) or a processor coupled thereunto, may determine the ROI based on data from a gaze-tracking sensor. For example, gaze engine 502 may determine ROI indicator 504 based on a gaze detected by a gaze-tracking sensor.

In some aspects, the image sensor may generate a packet including the second indication of the ROI in a header of the packet and the image data in a payload of the packet. For example, image sensor 602 may generate packet 606 and include ROI indicator 608 in a header of packet 606 (e.g., in a header 704 of packet 700). In some aspects, the packet may be, or may include, a MIPI packet. In some aspects, the image sensor may generate a first packet including the second indication of the ROI in a footer of the first packet; and generate a second packet including the image data in a payload of the second packet. For example, image sensor 602 may generate multiple packets 606 and include indicator 608 in a first one of the multiple packets 606 and image data 610 in a second one of the multiple packets 606. For example, image sensor 602 may generate packets 800 and include ROI indicator 608 in footer 810 of packet 802 and image data 610 in payload 828 of packet 822.

In some aspects, an image sensor of the computing device (or one or more components thereof) (e.g., coupled to the ISP) may generate a first portion of an image corresponding to the ROI at a first resolution; and generate a second portion of the image outside of the ROI at a second resolution, wherein the first resolution is greater than the second resolution. For example, image sensor 404 of FIG. 4 may generate image data 406 having the first resolution and image data 408 having the second resolution.

At a block 904, the computing device (or one or more components thereof) (e.g., the ISP) may determine image-processing settings for processing the image data based on the ROL For example, ISP 612 may determine settings 628 based on ROI indicator 608.

At a block 906, the computing device (or one or more components thereof) (e.g., the ISP) may process the image data based on the image-processing settings. For example, ISP engine 626 may process image data 624 based on settings 628.

In some aspects, the computing device (or one or more components thereof) (e.g., the ISP) may include one or more ISP engines. Each of the one or more ISP engines may determine respective image-processing settings based on the ROI, and process the image data based on the respective image-processing settings. For example, ISP 612 may include ISP engine 626 and ISP engine 634. ISP engine 626 may determine settings 628 based on ROI indicator 622 and may process image data 624 based on settings 628. Additionally or alternatively, ISP engine 634 may determine settings 636 based on ROI indicator 630 and may process image data 632 based on settings 636.

In some aspects, the computing device (or one or more components thereof) (e.g., the ISP) may include one or more ISP engines. Each of the one or more ISP engines may receive the image data and the indication of the ROI from the image sensor or from a prior ISP engine of the one or more ISP engines; and provide the image data and the indication of the ROI to a subsequent ISP engine of the one or more ISP engines or at an output of the ISP. For example, ISP 612 may include ISP engine 626 and ISP engine 634. ISP engine 626 may determine settings 628 based on ROI indicator 622 and may process image data 624 based on settings 628. Additionally or alternatively, ISP engine 634 may determine settings 636 based on ROI indicator 630 and may process image data 632 based on settings 636.

In some aspects, the computing device (or one or more components thereof) (e.g., the ISP may perform operations associated with at least one of: lens-shading correction; Bad Pixel Correction (BPC); phase-detection pixel correction; demosaicing; lateral chromatic aberration correction; Bayer filtering; adaptive Bayer filtering; tone mapping; and/or noise reduction.

In some aspects, the computing device (or one or more components thereof) (e.g., the ISP) may include a first ISP engine and/or a second ISP engine. The first ISP engine may: determine, based on the ROI, first image-processing settings related to a first ISP operation; and perform the first ISP operation based on the first image-processing settings. The second ISP engine may determine, based on the ROI, second image-processing settings related to a second ISP operation; and perform the second ISP operation based on the second image-processing settings. For example, ISP 612 may include ISP engine 626 and ISP engine 634. ISP engine 626 may determine settings 628 based on first ISP operation of ISP engine 626 and may perform the first IPS operation on image data 624 based on settings 628. Additionally or alternatively, ISP engine 634 may determine settings 636 based second ISP operation of ISP engine 634 and may perform the second IPS operation on image data 632 based on settings 636. The first ISP operation and the second ISP operation may be associated with at least a respective one of: lens-shading correction; Bad Pixel Correction (BPC); phase-detection pixel correction; demosaicing; lateral chromatic aberration correction; Bayer filtering; adaptive Bayer filtering; tone mapping; or noise reduction.

In some aspects, the computing device (or one or more components thereof) (e.g., the ISP) may process the image data as it is received from the image sensor. For example, ISP 612 may process image data 610 as image data 610 is received from image sensor 602.

In some examples, as noted previously, the methods described herein (e.g., process 900 of FIG. 9, and/or other methods described herein) can be performed, in whole or in part, by a computing device or apparatus. In one example, one or more of the methods can be performed by XR system 100 of FIG. 1, XR device 102 of FIG. 1, companion device 104 of FIG. 1, XR system 200 of FIG. 2, image sensor 202 of FIG. 2, compute components 214 of FIG. 2, image-processing system 300 of FIG. 3, image-capture device 302 of FIG. 3, image-processing device 304 of FIG. 3, image processor 324 of FIG. 3, system 400 of FIG. 4, image sensor 404 of FIG. 4, ISP 410 of FIG. 4, system 500 of FIG. 5, image sensor 514 of FIG. 5, ISP 518 of FIG. 5, system 600A of FIG. 6A, system 600B of FIG. 6B, image sensor 602 of FIG. 6A or FIG. 6B, ISP 612 of FIG. 6A or FIG. 6B, or by another system or device. In another example, one or more of the methods (e.g., process 900 of FIG. 9, and/or other methods described herein) can be performed, in whole or in part, by the computing-device architecture 1200 shown in FIG. 12. For instance, a computing device with the computing-device architecture 1200 shown in FIG. 12 can include, or be included in, the components of the XR system 100 of FIG. 1, XR device 102 of FIG. 1, companion device 104 of FIG. 1, XR system 200 of FIG. 2, image sensor 202 of FIG. 2, compute components 214 of FIG. 2, image-processing system 300 of FIG. 3, image-capture device 302 of FIG. 3, image-processing device 304 of FIG. 3, image processor 324 of FIG. 3, system 400 of FIG. 4, image sensor 404 of FIG. 4, ISP 410 of FIG. 4, system 500 of FIG. 5, image sensor 514 of FIG. 5, ISP 518 of FIG. 5, system 600A of FIG. 6A, system 600B of FIG. 6B, image sensor 602 of FIG. 6A or FIG. 6B, ISP 612 of FIG. 6A or FIG. 6B and can implement the operations of process 900, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component (s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 900 and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 900 and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

As noted above, various aspects of the present disclosure can use machine-learning models or systems.

Figure 10:
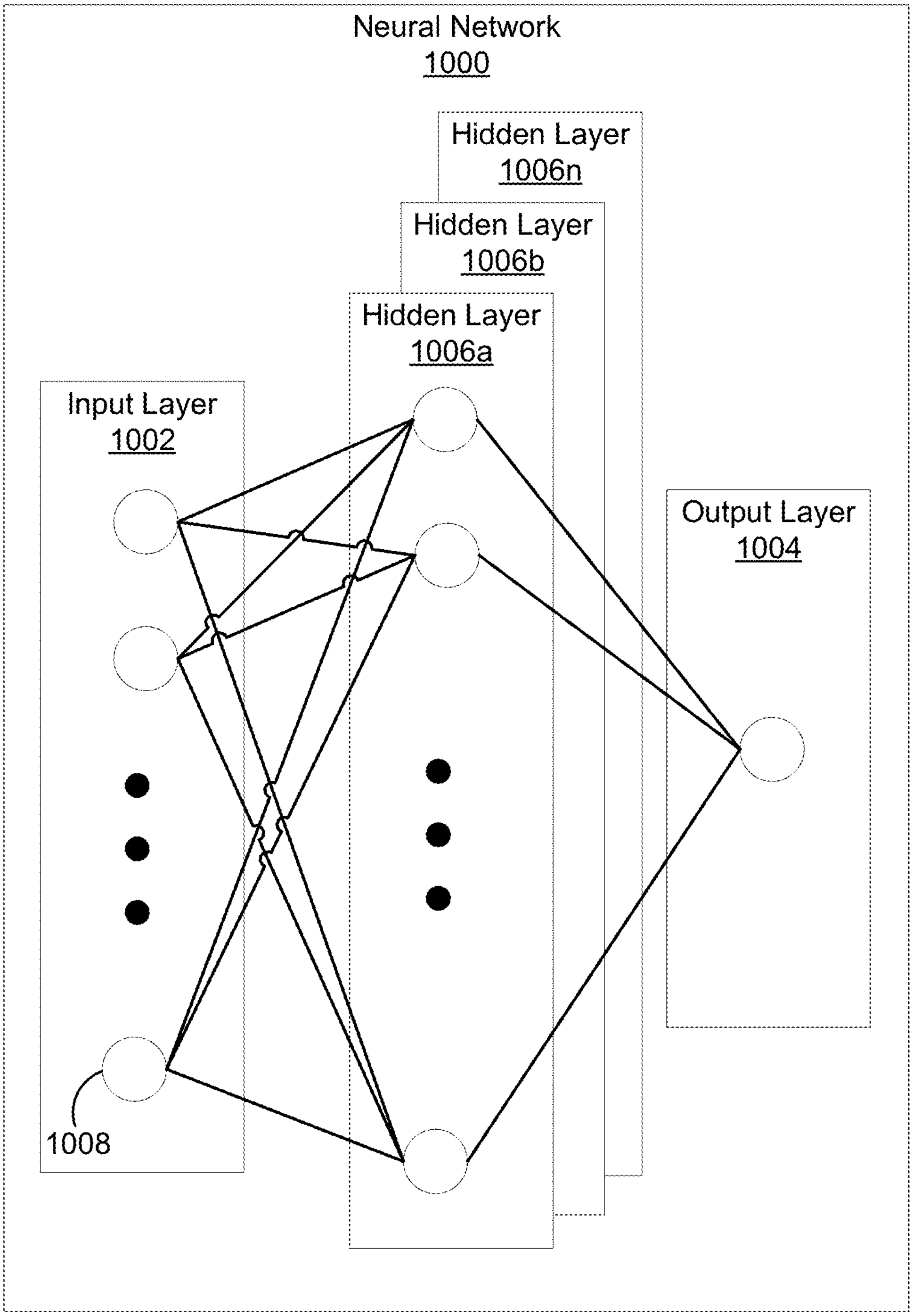
FIG. 10 is a block diagram illustrating an example of a deep learning neural network that can be used to implement a perception module and/or one or more validation modules, according to some aspects of the disclosed technology.

FIG. 10 is an illustrative example of a neural network 1000 (e.g., a deep-learning neural network) that can be used to implement machine-learning based feature segmentation, implicit-neural-representation generation, rendering, classification, object detection, image recognition (e.g., face recognition, object recognition, scene recognition, etc.), feature extraction, authentication, gaze detection, gaze prediction, and/or automation. Neural network 1000 may be an example of, or can implement, gaze engine 502 of FIG. 5. Further, neural network 1000 may take image data 420 of FIG. 4, image data 522 of FIG. 5, image data 616 and/or ROI indicator 618 of FIG. 6A and FIG. 6B, as inputs.

An input layer 1002 includes input data. In one illustrative example, input layer 1002 can include data representing images of eyes of a user, image data 420, image data 522, image data 616, and/or ROI indicator 618. Neural network 1000 includes multiple hidden layers hidden layers **1006*a*, 1006*b*, through 1006*n*. The hidden layers 1006*a*, 1006*b*, through hidden layer 1006*n* include "n" number of hidden layers, where "n" is an integer greater than or equal to one. The number of hidden layers can be made to include as many layers as needed for the given application. Neural network 1000 further includes an output layer 1004 that provides an output resulting from the processing performed by the hidden layers 1006*a*, 1006*b*, through 1006*n*. In one illustrative example, output layer 1004 can provide ROI indicator 504 of FIG. 5**.

Neural network 1000 may be, or may include, a multi-layer neural network of interconnected nodes. Each node can represent a piece of information. Information associated with the nodes is shared among the different layers and each layer retains information as information is processed. In some cases, neural network 1000 can include a feed-forward network, in which case there are no feedback connections where outputs of the network are fed back into itself. In some cases, neural network 1000 can include a recurrent neural network, which can have loops that allow information to be carried across nodes while reading in input.

Information can be exchanged between nodes through node-to-node interconnections between the various layers. Nodes of input layer 1002 can activate a set of nodes in the first hidden layer 1006*a*. For example, as shown, each of the input nodes of input layer 1002 is connected to each of the nodes of the first hidden layer 1006*a*. The nodes of first hidden layer 1006*a* can transform the information of each input node by applying activation functions to the input node information. The information derived from the transformation can then be passed to and can activate the nodes of the next hidden layer 1006*b*, which can perform their own designated functions. Example functions include convolutional, up-sampling, data transformation, and/or any other suitable functions. The output of the hidden layer 1006*b* can then activate nodes of the next hidden layer, and so on. The output of the last hidden layer 1006*n* can activate one or more nodes of the output layer 1004, at which an output is provided. In some cases, while nodes (e.g., node 1008) in neural network 1000 are shown as having multiple output lines, a node has a single output and all lines shown as being output from a node represent the same output value.

In some cases, each node or interconnection between nodes can have a weight that is a set of parameters derived from the training of neural network 1000. Once neural network 1000 is trained, it can be referred to as a trained neural network, which can be used to perform one or more operations. For example, an interconnection between nodes can represent a piece of information learned about the interconnected nodes. The interconnection can have a tunable numeric weight that can be tuned (e.g., based on a training dataset), allowing neural network 1000 to be adaptive to inputs and able to learn as more and more data is processed.

Neural network 1000 may be pre-trained to process the features from the data in the input layer 1002 using the different hidden layers 1006*a*, 1006*b*, through 1006*n* in order to provide the output through the output layer 1004. In an example in which neural network 1000 is used to identify features in images, neural network 1000 can be trained using training data that includes both images and labels, as described above. For instance, training images can be input into the network, with each training image having a label indicating the features in the images (for the feature-segmentation machine-learning system) or a label indicating classes of an activity in each image. In one example using object classification for illustrative purposes, a training image can include an image of a number 2, in which case the label for the image can be [0 0 1 0 0 0 0 0 0 0].

In some cases, neural network 1000 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until neural network 1000 is trained well enough so that the weights of the layers are accurately tuned.

For the example of identifying objects in images, the forward pass can include passing a training image through neural network 1000. The weights are initially randomized before neural network 1000 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for neural network 1000, the output will likely include values that do not give preference to any particular class due to the weights being randomly selected at initialization. For example, if the output is a vector with probabilities that the object includes different classes, the probability value for each of the different classes can be equal or at least very similar (e.g., for ten possible classes, each class can have a probability value of 0.1). With the initial weights, neural network 1000 is unable to determine low-level features and thus cannot make an accurate determination of what the classification of the object might be. A loss function can be used to analyze error in the output. Any suitable loss function definition can be used, such as a cross-entropy loss. Another example of a loss function includes the mean squared error (MSE), defined as $$E_{total} = \sum \frac{1}{2}(\text{target} - \text{output})^2$$

The loss can be set to be equal to the value of $E_{total}$.

The loss (or error) will be high for the first training images since the actual values will be much different than the predicted output. The goal of training is to minimize the amount of loss so that the predicted output is the same as the training label. Neural network 1000 can perform a backward pass by determining which inputs (weights) most contributed to the loss of the network and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

Neural network 1000 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. Neural network 1000 can include any other deep network other than a CNN, such as an autoencoder, a deep belief nets (DBNs), a Recurrent Neural Networks (RNNs), among others.

Figure 11:
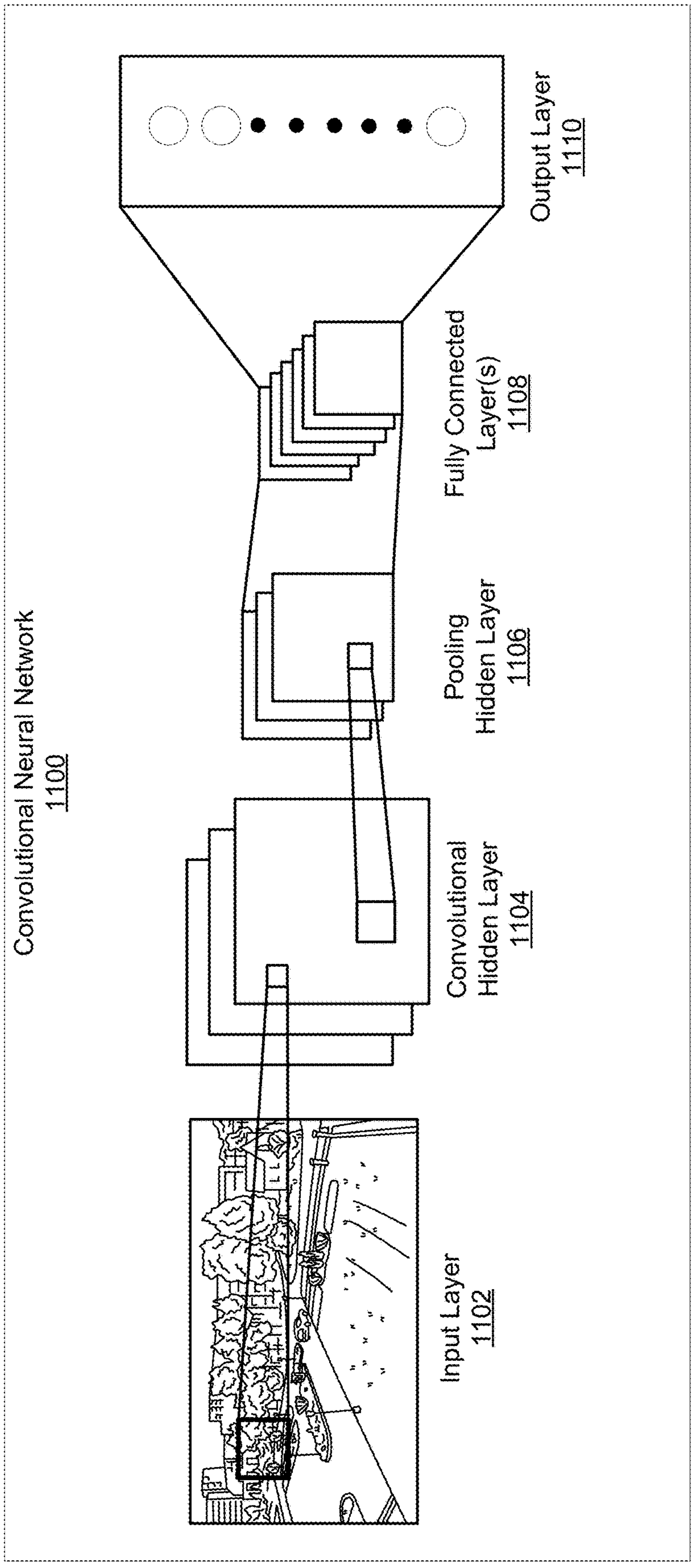
FIG. 11 is a block diagram illustrating an example of a convolutional neural network (CNN), according to various aspects of the present disclosure.

FIG. 11 is an illustrative example of a convolutional neural network (CNN) 1100. The input layer 1102 of the CNN 1100 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1104, an optional non-linear activation layer, a pooling hidden layer 1106, and fully connected layer 1108 (which fully connected layer 1108 can be hidden) to get an output at the output layer 1110. While only one of each hidden layer is shown in FIG. 11, one of ordinary skill will appreciate that multiple convolutional hidden layers, non-linear layers, pooling hidden layers, and/or fully connected layers can be included in the CNN 1100. As previously described, the output can indicate a single class of an object or can include a probability of classes that best describe the object in the image.

The first layer of the CNN 1100 can be the convolutional hidden layer 1104. The convolutional hidden layer 1104 can analyze image data of the input layer 1102. Each node of the convolutional hidden layer 1104 is connected to a region of nodes (pixels) of the input image called a receptive field. The convolutional hidden layer 1104 can be considered as one or more filters (each filter corresponding to a different activation or feature map), with each convolutional iteration of a filter being a node or neuron of the convolutional hidden layer 1104. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1104. Each connection between a node and a receptive field for that node learns a weight and, in some cases, an overall bias such that each node learns to analyze its particular local receptive field in the input image. Each node of the convolutional hidden layer 1104 will have the same weights and bias (called a shared weight and a shared bias). For example, the filter has an array of weights (numbers) and the same depth as the input. A filter will have a depth of 3 for an image frame example (according to three color components of the input image). An illustrative example size of the filter array is 5×5×3, corresponding to a size of the receptive field of a node.

The convolutional nature of the convolutional hidden layer 1104 is due to each node of the convolutional layer being applied to its corresponding receptive field. For example, a filter of the convolutional hidden layer 1104 can begin in the top-left corner of the input image array and can convolve around the input image. As noted above, each convolutional iteration of the filter can be considered a node or neuron of the convolutional hidden layer 1104. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1104. For example, a filter can be moved by a step amount (referred to as a stride) to the next receptive field. The stride can be set to 1 or any other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1104.

The mapping from the input layer to the convolutional hidden layer 1104 is referred to as an activation map (or feature map). The activation map includes a value for each node representing the filter results at each location of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1104 can include several activation maps in order to identify multiple features in an image. The example shown in FIG. 11 includes three activation maps. Using three activation maps, the convolutional hidden layer 1104 can detect three different kinds of features, with each feature being detectable across the entire image.

In some examples, a non-linear hidden layer can be applied after the convolutional hidden layer 1104. The non-linear layer can be used to introduce non-linearity to a system that has been computing linear operations. One illustrative example of a non-linear layer is a rectified linear unit (ReLU) layer. A ReLU layer can apply the function f(x)=max (0, x) to all of the values in the input volume, which changes all the negative activations to 0. The ReLU can thus increase the non-linear properties of the CNN 1100 without affecting the receptive fields of the convolutional hidden layer 1104.

The pooling hidden layer 1106 can be applied after the convolutional hidden layer 1104 (and after the non-linear hidden layer when used). The pooling hidden layer 1106 is used to simplify the information in the output from the convolutional hidden layer 1104. For example, the pooling hidden layer 1106 can take each activation map output from the convolutional hidden layer 1104 and generates a condensed activation map (or feature map) using a pooling function. Max-pooling is one example of a function performed by a pooling hidden layer. Other forms of pooling functions be used by the pooling hidden layer 1106, such as average pooling, L2-norm pooling, or other suitable pooling functions. A pooling function (e.g., a max-pooling filter, an L2-norm filter, or other suitable pooling filter) is applied to each activation map included in the convolutional hidden layer 1104. In the example shown in FIG. 11, three pooling filters are used for the three activation maps in the convolutional hidden layer 1104.

In some examples, max-pooling can be used by applying a max-pooling filter (e.g., having a size of 2×2) with a stride (e.g., equal to a dimension of the filter, such as a stride of 2) to an activation map output from the convolutional hidden layer 1104. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1104 having a dimension of 24×24 nodes, the output from the pooling hidden layer 1106 will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling) and using the computed values as an output.

The pooling function (e.g., max-pooling, L2-norm pooling, or other pooling function) determines whether a given feature is found anywhere in a region of the image and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1100.

The final layer of connections in the network is a fully-connected layer that connects every node from the pooling hidden layer 1106 to every one of the output nodes in the output layer 1110. Using the example above, the input layer includes 28×28 nodes encoding the pixel intensities of the input image, the convolutional hidden layer 1104 includes 3×24×24 hidden feature nodes based on application of a 5×5 local receptive field (for the filters) to three activation maps, and the pooling hidden layer 1106 includes a layer of 3×12×12 hidden feature nodes based on application of max-pooling filter to 2×2 regions across each of the three feature maps. Extending this example, the output layer 1110 can include ten output nodes. In such an example, every node of the 3×12×12 pooling hidden layer 1106 is connected to every node of the output layer 1110.

The fully connected layer 1108 can obtain the output of the previous pooling hidden layer 1106 (which should represent the activation maps of high-level features) and determines the features that most correlate to a particular class. For example, the fully connected layer 1108 can determine the high-level features that most strongly correlate to a particular class and can include weights (nodes) for the high-level features. A product can be computed between the weights of the fully connected layer 1108 and the pooling hidden layer 1106 to obtain probabilities for the different classes. For example, if the CNN 1100 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1110 can include an M-dimensional vector (in the prior example, M=10). M indicates the number of classes that the CNN 1100 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

FIG. 12 illustrates an example computing-device architecture 1200 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 1200 may include, implement, or be included in any or all of XR system 100 of FIG. 1, XR device 102 of FIG. 1, companion device 104 Of FIG. 1, XR system 200 of FIG. 2, compute components 214 of FIG. 2, image-processing system 300 of FIG. 3, image processor 324 of FIG. 3, system 400 of FIG. 4, system 500 of FIG. 5, system 600A of FIG. 6A, and/or system 600B of FIG. 6B.

The components of computing-device architecture 1200 are shown in electrical communication with each other using connection 1212, such as a bus. The example computing-device architecture 1200 includes a processing unit (CPU or processor) 1202 and computing device connection 1212 that couples various computing device components including computing device memory 1210, such as read only memory (ROM) 1208 and random-access memory (RAM) 1206, to processor 1202.

Computing-device architecture 1200 can include a cache of high-speed memory connected directly with, in close proximity to, or integrated as part of processor 1202. Computing-device architecture 1200 can copy data from memory 1210 and/or the storage device 1214 to cache 1204 for quick access by processor 1202. In this way, the cache can provide a performance boost that avoids processor 1202 delays while waiting for data. These and other modules can control or be configured to control processor 1202 to perform various actions. Other computing device memory 1210 may be available for use as well. Memory 1210 can include multiple different types of memory with different performance characteristics. Processor 1202 can include any general-purpose processor and a hardware or software service, such as service 1 1216, service 2 1218, and service 3 1220 stored in storage device 1214, configured to control processor 1202 as well as a special-purpose processor where software instructions are incorporated into the processor design. Processor 1202 may be a self-contained system, containing multiple cores or processors, a bus, memory controller, cache, etc. A multi-core processor may be symmetric or asymmetric.

To enable user interaction with the computing-device architecture 1200, input device 1222 can represent any number of input mechanisms, such as a microphone for speech, a touch-sensitive screen for gesture or graphical input, keyboard, mouse, motion input, speech and so forth. Output device 1224 can also be one or more of a number of output mechanisms known to those of skill in the art, such as a display, projector, television, speaker device, etc. In some instances, multimodal computing devices can enable a user to provide multiple types of input to communicate with computing-device architecture 1200. Communication interface 1226 can generally govern and manage the user input and computing device output. There is no restriction on operating on any particular hardware arrangement and therefore the basic features here may easily be substituted for improved hardware or firmware arrangements as they are developed.

Storage device 1214 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 1206, read only memory (ROM) 1208, and hybrids thereof. Storage device 1214 can include services 1216, 1218, and 1220 for controlling processor 1202. Other hardware or software modules are contemplated. Storage device 1214 can be connected to the computing device connection 1212. In one aspect, a hardware module that performs a particular function can include the software component stored in a computer-readable medium in connection with the necessary hardware components, such as processor 1202, connection 1212, output device 1224, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for processing data, the apparatus comprising: an image signal processor (ISP) configured to: receive image data and an indication of a region of interest (ROI) from an image sensor; determine image-processing settings for processing the image data based on the ROI; and process the image data based on the image-processing settings.

Aspect 2. The apparatus of aspect 1, wherein the ISP comprises one or more ISP engines, wherein each of the one or more ISP engines is configured to: determine respective image-processing settings based on the ROI; and process the image data based on the respective image-processing settings.

Aspect 3. The apparatus of any one of aspects 1 or 2, wherein the ISP comprises one or more ISP engines, wherein each of the one or more ISP engines is configured to: receive the image data and the indication of the ROI from the image sensor or from a prior ISP engine of the one or more ISP engines; and provide the image data and the indication of the ROI to a subsequent ISP engine of the one or more ISP engines or at an output of the ISP.

Aspect 4. The apparatus of aspect 3, wherein the one or more ISP engines comprise a camera serial interface (CSI) decoder configured to: receive a packet comprising the image data and the indication of the ROI from the image sensor; parse the packet; and provide the image data and the indication of the ROI to a subsequent ISP engine of the one or more ISP engines.

Aspect 5. The apparatus of any one of aspects 1 to 4, wherein the ISP is configured to perform operations associated with at least one of: lens-shading correction; Bad Pixel Correction (BPC); phase-detection pixel correction; demosaicing; lateral chromatic aberration correction; Bayer filtering; adaptive Bayer filtering; tone mapping; or noise reduction.

Aspect 6. The apparatus of any one of aspects 1 to 5, wherein the ISP comprises at least one of: a first ISP engine configured to: determine, based on the ROI, first image-processing settings related to a first ISP operation; and perform the first ISP operation based on the first image-processing settings; and a second ISP engine configured to: determine, based on the ROI, second image-processing settings related to a second ISP operation; and perform the second ISP operation based on the second image-processing settings.

Aspect 7. The apparatus of aspect 6, wherein each of the first ISP operation and the second ISP operation is associated with at least a respective one of: lens-shading correction; Bad Pixel Correction (BPC); phase-detection pixel correction; demosaicing; lateral chromatic aberration correction; Bayer filtering; adaptive Bayer filtering; tone mapping; or noise reduction.

Aspect 8. The apparatus of any one of aspects 1 to 7, wherein, to process the image data, the ISP is configured to process the image data as it is received from the image sensor.

Aspect 9. The apparatus of any one of aspects 1 to 8, wherein the ISP is configured to receive the image data and the indication of the ROI in a packet and the ISP is configured to parse the indication of the ROI from a header of the packet.

Aspect 10. The apparatus of aspect 9, wherein the packet comprises a Mobile Industry Processor Interface (MIPI) packet.

Aspect 11. The apparatus of any one of aspects 1 to 10, wherein the ISP is configured to receive the indication of the ROI in a footer of a first packet, wherein the ISP is configured to parse the indication of the ROI from the footer of the first packet, and wherein the ISP is configured to receive the image data in a payload of a second packet.

Aspect 12. The apparatus of any one of aspects 1 to 11, wherein the indication of the ROI is a first indication of the ROI and wherein the apparatus further comprises: the image sensor, wherein the image sensor is configured to: receive a second indication of the ROI; generate the image data based on the ROI; and provide the image data and the first indication of the ROI to an image signal processor (ISP).

Aspect 13. The apparatus of aspect 12, wherein, to generate the image data, the image sensor is configured to: generate a first portion of an image corresponding to the ROI at a first resolution; and generate a second portion of the image outside of the ROI at a second resolution, wherein the first resolution is greater than the second resolution.

Aspect 14. The apparatus of any one of aspects 12 or 13, further comprising at least one processor configured to determine the ROI based on data from a gaze-tracking sensor.

Aspect 15. The apparatus of any one of aspects 12 to 14, wherein, to provide the image data and the second indication of the ROI to the ISP, the image sensor is configured to generate a packet including the second indication of the ROI in a header of the packet and the image data in a payload of the packet.

Aspect 16. The apparatus of aspect 15, wherein the packet comprises a Mobile Industry Processor Interface (MIPI) packet.

Aspect 17. The apparatus of any one of aspects 12 to 16, wherein: to provide the second indication of the ROI to the ISP, the image sensor is configured to generate a first packet including the second indication of the ROI in a footer of the first packet; and to provide the image data to the ISP, the image sensor is configured to generate a second packet including the image data in a payload of the second packet.

Aspect 18. A method for processing data, the method comprising: receiving, at an image signal processor (ISP), image data and an indication of a region of interest (ROI) from an image sensor; determining, at the ISP, image-processing settings for processing the image data based on the ROI; and process, at the ISP, the image data based on the image-processing settings.

Aspect 19. The method of aspect 18, wherein the ISP comprises one or more ISP engines, and further comprising: determining, at each of the one or more ISP engines, respective image-processing settings based on the ROI, and processing, at each of the one or more ISP engines, the image data based on the respective image-processing settings.

Aspect 20. The method of any one of aspects 18 or 19, wherein the ISP comprises one or more ISP engines, and further comprising: receiving, at each of the one or more ISP engines, the image data and the indication of the ROI from the image sensor or from a prior ISP engine of the one or more ISP engines; and providing, at each of the one or more ISP engines, the image data and the indication of the ROI to a subsequent ISP engine of the one or more ISP engines or at an output of the ISP.

Aspect 21. The method of aspect 20, further comprising: receiving, at a camera serial interface (CSI) decoder, a packet comprising the image data and the indication of the ROI from the image sensor; parsing, at the CSI decoder, the packet; and providing, at the CSI decoder, the image data and the indication of the ROI to a subsequent ISP engine of the one or more ISP engines.

Aspect 22. The method of any one of aspects 18 to 21, further comprising performing operations associated with at least one of: lens-shading correction; Bad Pixel Correction (BPC); phase-detection pixel correction; demosaicing; lateral chromatic aberration correction; Bayer filtering; adaptive Bayer filtering; tone mapping; or noise reduction.

Aspect 23. The method of any one of aspects 18 to 22, further comprising at least one of: determining, at a first ISP engine, based on the ROI, first image-processing settings related to a first ISP operation; and performing, at the first IPS engine the first ISP operation based on the first image-processing settings; or determining, at a second ISP engine, based on the ROI, second image-processing settings related to a second ISP operation; and performing, at the second ISP engine, the second ISP operation based on the second image-processing settings.

Aspect 24. The method of aspect 23, wherein each of the first ISP operation and the second ISP operation is associated with at least a respective one of: lens-shading correction; Bad Pixel Correction (BPC); phase-detection pixel correction; demosaicing; lateral chromatic aberration correction; Bayer filtering; adaptive Bayer filtering; tone mapping; or noise reduction.

Aspect 25. The method of any one of aspects 18 to 24, processing the image data comprises processing the image data as it is received from the image sensor.

Aspect 26. The method of any one of aspects 18 to 25, further comprising receiving the image data and the indication of the ROI in a packet and parsing the indication of the ROI from a header of the packet.

Aspect 27. The method of aspect 26, wherein the packet comprises a Mobile Industry Processor Interface (MIPI) packet.

Aspect 28. The method of any one of aspects 18 to 27, further comprising receiving the indication of the ROI in a footer of a first packet, wherein the ISP is configured to parse the indication of the ROI from the footer of the first packet, and wherein the ISP is configured to receive the image data in a payload of a second packet.

Aspect 29. The method of any one of aspects 18 to 28, wherein the indication of the ROI is a first indication of the ROI and further comprising: receiving, at an image sensor, a second indication of the ROI; generating, at the image sensor, the image data based on the ROI; and providing, from the image sensor, the image data and the first indication of the ROI to an image signal processor (ISP).

Aspect 30. The method of aspect 29, further comprising: generating, at the image sensor, a first portion of an image corresponding to the ROI at a first resolution; and generating, at the image sensor, a second portion of the image outside of the ROI at a second resolution, wherein the first resolution is greater than the second resolution.

What is claimed is:

1. An apparatus for processing data, the apparatus comprising:

an image signal processor (ISP) configured to:

receive a first packet including a region of interest (ROI) indicator corresponding to an ROI of image data to be received, wherein the ROI indicator is indicative of a position and a size of the ROI;

determine image-processing settings for processing the image data based on the ROI indicator included in the packet;

receive a second packet including the image data corresponding to the ROI indicator; and process the image data included in the second packet based on the image-processing settings determined based on the ROI indicator included in the first packet.

2. The apparatus of claim 1, wherein the ISP comprises one or more ISP engines, wherein each of the one or more ISP engines is configured to:

determine respective image-processing settings based on the ROI; and process the image data based on the respective image-processing settings.

3. The apparatus of claim 1, wherein the ISP comprises one or more ISP engines, wherein each of the one or more ISP engines is configured to:

receive the image data and the ROI indicator from an image sensor or from a prior ISP engine of the one or more ISP engines; and provide the image data and the ROI indicator to a subsequent ISP engine of the one or more ISP engines or at an output of the ISP.

4. The apparatus of claim 3, wherein the one or more ISP engines comprise a camera serial interface (CSI) decoder configured to:

receive, from the image sensor, the first packet including the ROI indicator and the second packet including the image data;

parse the first packet and the second packet; and provide the image data and the ROI indicator to a subsequent ISP engine of the one or more ISP engines.

5. The apparatus of claim 1, wherein the ISP is configured to perform operations associated with at least one of:

lens-shading correction;

Bad Pixel Correction (BPC);

phase-detection pixel correction;

demosaicing;

lateral chromatic aberration correction;

Bayer filtering;

adaptive Bayer filtering;

tone mapping; or noise reduction.

6. The apparatus of claim 1, wherein the ISP comprises at least one of:

a first ISP engine configured to:

determine, based on the ROI indicator, first image-processing settings related to a first ISP operation; and perform the first ISP operation based on the first image-processing settings; and a second ISP engine configured to:

determine, based on the ROI indicator, second image-processing settings related to a second ISP operation; and perform the second ISP operation based on the second image-processing settings.

7. The apparatus of claim 6, wherein each of the first ISP operation and the second ISP operation is associated with at least a respective one of:

lens-shading correction;

Bad Pixel Correction (BPC);

phase-detection pixel correction;

demosaicing;

lateral chromatic aberration correction;

Bayer filtering;

adaptive Bayer filtering;

tone mapping; or noise reduction.

8. The apparatus of claim 1, wherein, to process the image data, the ISP is configured to process the image data as it is received from an image sensor.

9. The apparatus of claim 1, wherein the ISP is configured to receive the image data and the ROI indicator in the first packet including the ROI indicator and the second packet including the image data and the ISP is configured to parse the ROI indicator from a header of the first packet.

10. The apparatus of claim 9, wherein at least one of the first packet and the second packet comprises a Mobile Industry Processor Interface (MIPI) packet.

11. The apparatus of claim 1, wherein the ISP is configured to receive the ROI indicator in a footer of the first packet, wherein the ISP is configured to parse the ROI indicator from the footer of the first packet, and wherein the ISP is configured to receive the image data in a payload of the second packet.

12. The apparatus of claim 1, wherein the ROI indicator is a first ROI indicator and wherein the apparatus further comprises:

an image sensor, wherein the image sensor is configured to:

receive a second ROI indicator;

generate the image data based on the second ROI indicator; and provide the image data and the first ROI indicator to the ISP.

13. The apparatus of claim 12, wherein, to generate the image data, the image sensor is configured to:

generate a first portion of an image corresponding to the ROI indicator at a first resolution; and generate a second portion of the image outside of the ROI indicator at a second resolution, wherein the first resolution is greater than the second resolution.

14. The apparatus of claim 12, further comprising at least one processor configured to determine the ROI indicator based on data from a gaze-tracking sensor.

15. The apparatus of claim 12, wherein, to provide the image data and the second ROI indicator to the ISP, the image sensor is configured to generate a third packet including the second ROI indicator in a header of the third packet and the image data in a payload of the third packet.

16. The apparatus of claim 15, wherein the third packet comprises a Mobile Industry Processor Interface (MIPI) packet.

17. The apparatus of claim 12, wherein:

to provide the second ROI indicator to the ISP, the image sensor is configured to generate a third packet including the second ROI indicator in a footer of the third packet; and to provide the image data to the ISP, the image sensor is configured to generate a fourth packet including the image data in a payload of the fourth packet.

18. A method for processing data, the method comprising:

receiving, at an image signal processor (ISP), a first packet including a region of interest (ROI) indicator corresponding to an ROI of image data to be received, wherein the ROI indicator is indicative of a position and a size of the ROI;

determining, at the ISP, image-processing settings for processing the image data based on the ROI indicator included in the packet;

receive a second packet including the image data corresponding to the ROI indicator; and process, at the ISP, the image data included in the second packet based on the image-processing settings determined based on the ROI indicator included in the first packet.

19. The method of claim 18, wherein the ISP comprises one or more ISP engines, and further comprising:

determining, at each of the one or more ISP engines, respective image-processing settings based on the ROI; and processing, at each of the one or more ISP engines, the image data based on the respective image-processing settings.

20. The method of claim 18, wherein the ISP comprises one or more ISP engines, and further comprising:

receiving, at each of the one or more ISP engines, the image data and the ROI indicator from an image sensor or from a prior ISP engine of the one or more ISP engines; and providing, at each of the one or more ISP engines, the image data and the ROI indicator to a subsequent ISP engine of the one or more ISP engines or at an output of the ISP.

21. The method of claim 20, further comprising:

receiving, at a camera serial interface (CSI) decoder and from the image sensor, the first packet including the ROI indicator and the second packet including the image data;

parsing, at the CSI decoder, the first packet and the second packet; and providing, at the CSI decoder, the image data and the ROI indicator to a subsequent ISP engine of the one or more ISP engines.

22. The method of claim 18, further comprising performing operations associated with at least one of:

lens-shading correction;

Bad Pixel Correction (BPC);

phase-detection pixel correction;

demosaicing;

lateral chromatic aberration correction;

Bayer filtering;

adaptive Bayer filtering;

tone mapping; or noise reduction.

23. The method of claim 18, further comprising at least one of:

determining, at a first ISP engine, based on the ROI indicator, first image-processing settings related to a first ISP operation; and performing, at the first ISP engine the first ISP operation based on the first image-processing settings; or determining, at a second ISP engine, based on the ROI indicator, second image-processing settings related to a second ISP operation; and performing, at the second ISP engine, the second ISP operation based on the second image-processing settings.

24. The method of claim 23, wherein each of the first ISP operation and the second ISP operation is associated with at least a respective one of:

lens-shading correction;

Bad Pixel Correction (BPC);

phase-detection pixel correction;

demosaicing;

lateral chromatic aberration correction;

Bayer filtering;

adaptive Bayer filtering;

tone mapping; or noise reduction.

25. The method of claim 18, processing the image data comprises processing the image data as it is received from an image sensor.

26. The method of claim 18, further comprising receiving the image data and the ROI indicator in the first packet including the ROI indicator and the second packet including the image data and parsing the ROI indicator from a header of the first packet.

27. The method of claim 26, wherein at least one of the first packet and the second packet comprises a Mobile Industry Processor Interface (MIPI) packet.

28. The method of claim 18, further comprising receiving the ROI indicator in a footer of the first packet, wherein the ISP is configured to parse the ROI indicator from the footer of the first packet, and wherein the ISP is configured to receive the image data in a payload of the second packet.

29. The method of claim 18, wherein the ROI indicator is a first ROI indicator and further comprising:

receiving, at an image sensor, a second ROI indicator;

generating, at the image sensor, the image data based on the second ROI indicator; and providing, from the image sensor, the image data and the first ROI indicator to the ISP.

30. The method of claim 29, further comprising:

generating, at the image sensor, a first portion of an image corresponding to the ROI indicator at a first resolution; and generating, at the image sensor, a second portion of the image outside of the ROI indicator at a second resolution, wherein the first resolution is greater than the second resolution.

* * * * *